United States Patent
Li et al.

(10) Patent No.: US 9,850,660 B2
(45) Date of Patent: Dec. 26, 2017

(54) SANDWICH PANEL WITH A DUCTILE HYBRID CORE COMPRISING TUBULAR REINFORCEMENTS

(71) Applicants: Guoqiang Li, Baton Rouge, LA (US); Gefu Ji, Baton Rouge, LA (US)

(72) Inventors: Guoqiang Li, Baton Rouge, LA (US); Gefu Ji, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 117 days.

(21) Appl. No.: 14/441,216

(22) PCT Filed: Nov. 7, 2013

(86) PCT No.: PCT/US2013/068895
§ 371 (c)(1),
(2) Date: May 7, 2015

(87) PCT Pub. No.: WO2014/116327
PCT Pub. Date: Jul. 31, 2014

(65) Prior Publication Data
US 2015/0300019 A1    Oct. 22, 2015

Related U.S. Application Data

(60) Provisional application No. 61/723,844, filed on Nov. 8, 2012.

(51) Int. Cl.
*E04C 2/40* (2006.01)
*B32B 1/08* (2006.01)
(Continued)

(52) U.S. Cl.
CPC .................. *E04C 2/40* (2013.01); *B32B 1/08* (2013.01); *B32B 3/266* (2013.01); *B32B 5/024* (2013.01);
(Continued)

(58) Field of Classification Search
CPC . Y10T 428/24744; B32B 5/024; B32B 5/245; B32B 3/266; B32B 1/08;
(Continued)

(56) References Cited

U.S. PATENT DOCUMENTS 2,024,496 A * 12/1935 Young ..................... F28F 9/013
165/134.1
2,369,006 A *  2/1945 Banks ....................... B63C 9/08
156/197
(Continued)

OTHER PUBLICATIONS

Bardella, L. et al., "On the elastic behavior of syntactic foams," International Journal of Solids and Structures, vol. 38, pp. 7235-7260 (2001).
(Continued)

*Primary Examiner* — Donald J Loney

(57) ABSTRACT

A hybrid core comprising a matrix and tubular structural reinforcements, such as a ductile matrix core reinforced with ductile hollow tubes, as well as panels which comprise such hybrid core. Embodiments of the invention manifest resistance to both interfacial debonding and ballistic penetration.

7 Claims, 20 Drawing Sheets

(51) Int. Cl.
B32B 5/02 (2006.01)
B32B 5/24 (2006.01)
B32B 3/26 (2006.01)

(52) U.S. Cl.
CPC .......... *B32B 5/245* (2013.01); *B32B 2250/40* (2013.01); *B32B 2262/101* (2013.01); *B32B 2266/06* (2013.01); *B32B 2307/54* (2013.01); *B32B 2307/558* (2013.01); *B32B 2571/02* (2013.01); *B32B 2605/00* (2013.01); *B32B 2607/00* (2013.01); *Y10T 428/24744* (2015.01)

(58) Field of Classification Search
CPC .......... B32B 2250/40; B32B 2262/101; B32B 2307/54; B32B 2307/558; B32B 2605/00; B32B 2607/00; B32B 2266/06; B32B 2571/02; E04C 2/40
See application file for complete search history.

(56) References Cited

U.S. PATENT DOCUMENTS

| | | | | |
|---|---|---|---|---|
| 4,753,841 A | * | 6/1988 | Noel | B29C 44/468 428/174 |
| 5,306,455 A | * | 4/1994 | Carroll | B26D 7/01 264/145 |
| 2009/0186710 A1 | * | 7/2009 | Joseph | B32B 5/022 472/64 |

OTHER PUBLICATIONS

Chakravarty, U.K., "An investigation on the dynamic response of polymeric, metallic, and biomaterial foams," Composite Structures, vol. 92, pp. 2339-2344 (2010).
Cristiani, C. et al., "Activation of metallic open-cell foams via washcoat deposition of Ni/MgAl2O4 catalysts for steam reforming reaction," Catalysis Today, Available online Oct. 16, 2012, http://dx.doi.org/10.1016/j.cattod.2012.09.003.
Evans, A.G. et al., "Multifunctionality of cellular metal systems," Progress in Materials Science, vol. 43, pp. 171-221 (1998).
Griffith, G., "Carbon foam: a next-generation structural material," Industrial Heating, vol. 69, pp. 47-52 (2002).
Hasebe, R.S. et al., "Performance of sandwich structures with composite reinforced core," Journal of Sandwich Structures and Materials, vol. 2, pp. 75-100 (2000).
Hosur, M.V. et al., "Manufacturing and low-velocity impact characterization of foam filled 3-D integrated core sandwich composites with hybrid face sheets," Composite Structures, vol. 69, pp. 167-181 (2005).
Ji, G. et al., "Strength Enhancement of Advanced Grid Stiffened FRP Tube Confined Concrete Cylinders under Fire," Journal of Composite Materials, vol. 43, pp. 2555-2569 (2009).
John, M. et al., "Self-Healing of Sandwich Structures with Grid Stiffened Shape Memory Polymer Syntactic Foam Core," Smart Materials and Structures, vol. 19, paper No. 075013 (12 pages) (2010).
Laschet, G. et al., "Microstructure based model for permeability predictions of open-cell metallic foams via homogenization," Materials Science and Engineering: A, vol. 472, pp. 214-226 (2008).
Li, G. et al., "A crumb rubber modified syntactic foam," Materials Science and Engineering A, vol. 474, pp. 390-399 (2008).
Li, G. et al., "A cement based syntactic foam," Materials Science and Engineering A, vol. 478, pp. 77-86 (2008).
Li, G. et al., "Development of rubberized syntactic foam," Composite Part A: *Applied Science and Manufacturing*, vol. 38, pp. 1483-1492 (2007).
Li, G. et al., "Impact Characterization of Sandwich Structures with an Integrated Orthogrid Stiffened Syntactic Foam Core," Composites Science and Technology, vol. 68, pp. 2078-2084 (2008).
Li, G. et al., "Isogrid Stiffened Syntactic Foam Cored Sandwich Structure under Low Velocity Impact," Composites Part A: Applied Science and Manufacturing, vol. 41, No. 1, pp. 177-184 (2010).
Reddy, T.Y. et al., "Penetration and perforation of composite sandwich panels by hemispherical and conical projectiles," ASME Journal of Pressure Vessel Technology, vol. 120, pp. 186-194 (1998).
Tavares, S. Sequeira et al., "Hybrid processing of thick skins for honeycomb sandwich structures," Composites Science and Technology, vol. 71, pp. 183-189 (2011).
Shutov, F.A., "Syntactic polymer foams," in Klempner D and Frisch KC ed. *Handbook of polymer foams and foam technology*, Hanser publishers, pp. 355-374 (1991).
Van Vuure, A.W., "Composite panels based on woven sandwich-fabric preforms," Ph.D. Thesis, Katholieke Universiteit Leuven, Belgium (1997).
Van Vuure, A.W. et al., "Mechanical properties of composite panels based on woven sandwich-fabric preforms," Composite: Part A, vol. 31, pp. 671-680 (2000).

* cited by examiner

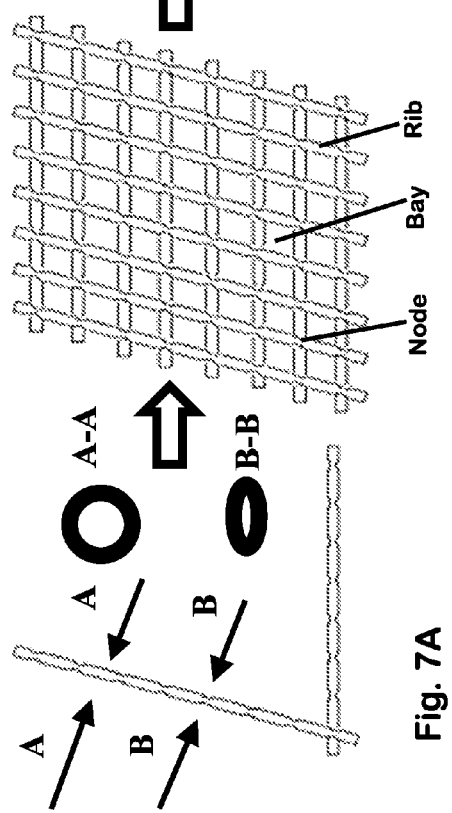
Fig. 7A
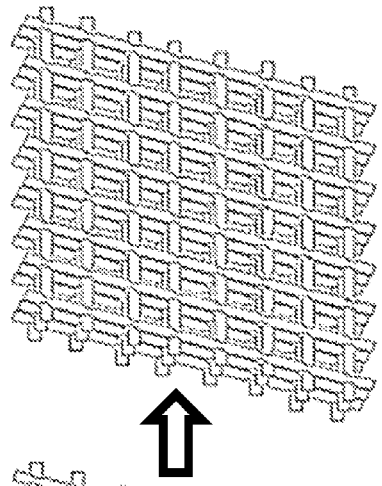
Fig. 7B
Fig. 7C
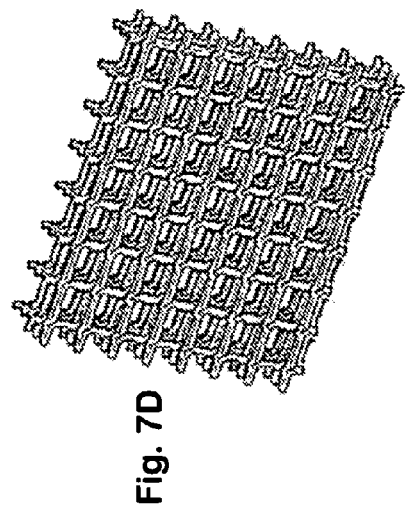
Fig. 7D
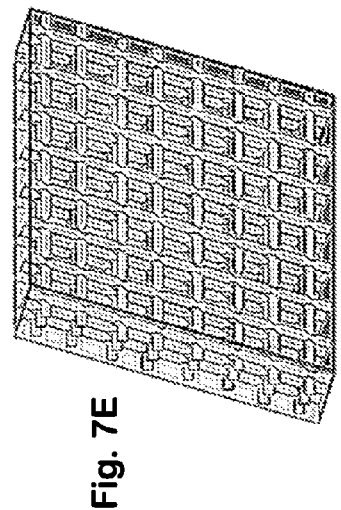
Fig. 7E tat
SANDWICH PANEL WITH A DUCTILE HYBRID CORE COMPRISING TUBULAR REINFORCEMENTS This is the United States national stage of international application PCT/US2013/068895, international filing date Nov. 7, 2013, which claims the benefit of the Nov. 8, 2012 filing date of U.S. provisional patent application Ser. No. 61/723,844 under 35 U.S.C. §119(e). The complete disclosure of the priority application is hereby incorporated by reference in its entirety.

This invention was made with government support under grant NNX07AT67A awarded by the National Aeronautics and Space Administration; grant NNX11AM17A awarded by the National Aeronautics and Space Administration; and, supported by the NSF under grant number CMMI0900064. The United States government has certain rights in the invention.

TECHNICAL FIELD

This invention relates to structural materials, more particularly it relates to sandwich panels comprising hybrid core comprising a ductile matrix which is reinforced by tubular structural elements.

BACKGROUND ART

Advanced composite sandwich structures have been widely used in aerospace structures, autos, armors, wind turbine blades, pipelines, bridge decks, etc. due to their superior structural capacity in carrying transverse loads with minimal weight penalty [1-4]. Although sandwich construction has been extensively used in various fields, sandwich panels have not been fully exploited in critical structural applications due to damage tolerance and safety concerns.

Sandwich structures typically consist of skins (surfacing and back plates) and a core. The skins are mainly responsible for carrying the bending moment (in blast protective sandwich panels, the surfacing plate is also responsible for eroding, breaking and slowing down the projectiles) and the core takes care of separating and fixing the skin, carrying the transverse shear load, providing impact resistance, and taking other functional duties. Numerous efforts have been made to explore high-performance sandwich panels over the past several decades.

For a typical sandwich structure, three elements dominate its performance and function: the face sheets, the core, and the bond between the core and the face sheet. A major problem of sandwich panels is the debonding at or near the core/face sheet interface, especially under impact loading, which can lead to a sudden loss of structural integrity and cause catastrophic consequences. Such debonding may also restrict the contribution of impact energy absorption by the core to the entire sandwich structure. Despite the efforts in previous studies, this problem has not been well addressed.

Various types of core materials have been studied such as foam core (polymeric foam, metallic foam, ceramic foam, balsa wood, syntactic foam, etc.) [3, 4], truss, honeycomb and other web cores [5], 3-D integrated core [6, 7], foam filled web core [7, 8], laminated composite reinforced core [9], etc. While these core materials have been used with a certain success, they are limited in one way or another. For example, the brittle syntactic foam core absorbs impact energy primarily through macro length-scale damage, sacrificing residual strength significantly [10-12]; and web cores often lack suitable bonding with the skin and also have impact windows [7, 8]. An impact window is the open space in a core, which allows easy perforation of projectiles or escape of anything (e.g., fluid) which may be contained behind the panel. Among the foam cores, metallic foam has also been developed. Metallic foam material has received rapid and intensive attention over the past decade due to its high specific stiffness and superior energy absorption ability [13, 14, 15].

Previously, it was found that by filling the empty bays formed by continuous fiber reinforced polymer grid skeleton with polymeric material, the resulting composite sandwich could be improved as to impact mitigation [16, 17, 18, 19], although these approaches continued to have important limitations.

Prior approaches did address impact mitigation by:

(1) each cell is a small panel or mini-structure with elastic boundary, it thus tends to respond to impact in a quasi-static manner, i.e., similar to the behavior under static load;

(2) the periodic grid skeleton, the primary load carrying component with 2-D continuity, could be responsible for transferring the impact energy elastically, dissipating the energy primarily through vibration damping and providing the in-plane tensile strength and in-plane shear resistance;

(3) the light-weight polymer matrix in the bay, the secondary load carrying component, could be primarily responsible for absorbing impact energy through damage;

(4) the grid skeleton and the polymer in the bay could develop a positive composite action, i.e., the grid skeleton confines the polymeric bay to increase its strength and the polymer matrix provides lateral support to resist rib local buckling and crippling. In addition, the polymeric bay could also provide additional in-plane shear strength for bi-grids such as orthogrid; and (5) the core and skin could be fully bonded because the bay is fully filled, without the limitation of web cores.

However, with the prior approaches it is found that when the impact is on the rib or node of the grid skeleton, the residual strength is reduced considerably, due to the brittleness of the glass fibers [see, e.g., 17, 19]. For example, with about 300 J of impact energy, the projectile perforated the panel, suggesting poor perforation resistance [19]. Furthermore, because the impact caused fracture of the reinforcing fibers [19], and because the fibers are the primary load carrying component, this caused prior sandwich panels to lose their load carrying capacity permanently. Consequently such panels were radically impaired with subsequent impacts such as may occur in attack or military situations. Additionally, as the projectile impacted these materials it broke the reinforcing fibers, consequently the impact energy or impact wave could not be distributed or absorbed by the whole structure and this led to local perforation.

Another major problem of sandwich panels prior to the present invention has been debonding at or near the core/face sheet interface under impact loading, which can lead to a sudden loss of structural integrity and cause catastrophic consequences. The debonding may also restrict the contribution toward impact energy absorption by the core to the entire sandwich structure. This problem of debonding at or near the core/face sheet interface has remained an unmet need in the field.

DISCLOSURE OF THE INVENTION

The present invention comprises sandwich panels which comprise a ductile reinforced hybrid core. The reinforcements can be metal, alloy, shape memory alloy, ceramic, composites, polymer or polymeric. The reinforcements are in a form of millitubes/microtubes. Advantages of the invention with regard to use in critical structural applications include being amenable for mass production, the design is simple for implementation, and it possesses various favorable characteristics, preferably the panels are strong, stiff, ductile, tough, lightweight, impact-tolerant, and debonding-tolerant.

In a sandwich panel of the invention, the face sheet can be anything understood by those of ordinary skill to be used or usable in practice as face sheets. Although, a laminated composite was used in the examples herein, it is understood that other materials or other forms such as metal, polymer, ceramic, or hybrid composite may be comprised by the invention as a face sheet. For instance the face sheets of sandwich panels can be made of composite plate such as laminated carbon fiber reinforced polymer, ceramic chips, carbon nanotube enhanced FRP (fiber reinforced polymer) plate, etc.

The distribution pattern of these tubular reinforcements were parallel with and/or perpendicular to the plane of the surface face sheets/skin plates; in certain embodiments millitubes parallel with the surface plane are configured as a grid. Configurations with tubes which are parallel with the plane of the skin plates (whether the tubes are in unidirectional or in various grid or woven configurations) are preferred.

When measured at room temperature, the matrix can be, e.g., polymer, shape memory polymer, metal, glass or ceramic. Regardless of the material, the matrix is ductile having elongation at break in a range of about (3-200%); and preferably having properties of elastic modulus in a range of about 1.5-350 GPa, ultimate tensile strength in a range of about 25-350 MPa, and elongation at break in a range of about (3-200%). In alternative embodiments, an elastic modulus is in a range of about 2-4 GPa and a yielding strength is in a range of about 30-135 MPa. Thus, these ranges relate to either a thermosetting or thermoplastic polymer matrix, e.g., a typical thermosetting polyester's ultimate tensile strength is 34.5-130 MPa, and a typical thermoplastic polymer's ultimate tensile strength is 70-105 MPa. In one embodiment, properties of elastic modulus, ultimate tensile strength and elongation at break of about 2.76 GPa, 30 MPa and 3.5%, such as for LOCTITE Hysol 9460.

The structural reinforcements are tubular, it being understood that hollowness can achieve an advantage of weight savings, and as set forth herein have an advantage of facilitating impact energy absorption. Further, the reinforcements are ductile having elongation at break in a range of about (3-100%); and preferably an elastic modulus is in a range of about 1-1000 GPa and the ultimate tensile strength is in a range of 1-1000 MPa, and elongation at break in a range of about 3-100%. In alternative embodiments, an elastic modulus is in a range of about 1-210 GPa and ultimate tensile strength is in a range of about 80-775 MPa. Thus, these ranges relate to either an aluminum or steel millitube, e.g., a typical aluminum millitube's ultimate tensile strength is 86-265 MPa, and a typical steel millitube's ultimate tensile strength is 500-760 MPa in room temperature. In one embodiment, elastic modulus, ultimate tensile strength, and elongation of aluminum tube are 14.5 GPa, 121.2 MPa, and 3.01%; elastic modulus, ultimate tensile strength, and elongation of steel tube are 36.4 GPa, 527 MPa, and 65%, respectively.

Embodiments of the invention include: a hybrid core for structural sandwich panels, the hybrid core comprising: a ductile, tubular structural elements, and, a ductile matrix. This hybrid can comprise multiple of the ductile, tubular structural element, and these structural elements are present in at least two layers; each layer of structural elements can be essentially unidirectional with any layer it is adjacent to; or, each layer of structural elements can be essentially perpendicular to any layer it is adjacent to; or, each layer of structural elements can be essentially aligned at an angle other than 0° or 90° to any layer it is adjacent to, such as some angle between 0° or 90° such as 5°, 10°, 15°, 20°, 25°, 30°, 35°, 40°, 45°, 50°, 55°, 60°, 65°, 70°, 75°, 80°, 85° or 90°. Such foregoing hybrid core can: have structural elements of each layer are interwoven with structural elements of any layer they are adjacent to; or, the structural elements can comprise indentations, and the indentations in the structural elements of a layer are interposed (or seated within) with indentations in the structural elements of any layer of structural elements they are adjacent to. In any such hybrid core, when measured at room temperature, the ductile matrix can have: an elastic modulus within a range of 1.5-350 GPa; an ultimate tensile strength within a range of 25-350 MPa; and, an elongation at break of 3-200%. In any such hybrid core the ductile, tubular structural elements, when measured at room temperature, can have an elastic modulus within a range of 1-1000 GPa; an ultimate tensile strength within a range of 1-1000 MPa; and, an elongation at break of 3-100%.

An alternative embodiment comprises a sandwich panel comprising: a hybrid core which comprises a ductile tubular structural element; a ductile matrix; and, a face sheet. In such panel the structural element can have a longitudinal dimension, and the element's longitudinal dimension can be parallel with a surface plane of the face sheet. In a panel the structural element can be a continuous millitube. Such panel can comprise multiple of the structural elements; the structural elements can be present in at least 2, 3, 4, 5, 6, 7 or more than 7 layers. In such panel each layer of the structural elements can be essentially unidirectional with any layer of structural elements it is adjacent to; or, each layer of structural elements is essentially perpendicular to any layer of structural elements it is adjacent to; or, each layer of structural elements can be essentially aligned at an angle other than 0° or 90° to any layer of structural elements it is adjacent to such as, such as some angle between 0° or 90° such as 5°, 10°, 15°, 20°, 25°, 30°, 35°, 40°, 45°, 50°, 55°, 60°, 65°, 70°, 75°, 80°, 85° or 90°. In such panel, structural elements of each layer can be interwoven, and/or welded, and/or adhered or glued with structural elements of any layer they are adjacent to. Thus, various hybrid cores were investigated herein. As set forth in Example 1 and depicted in FIG. 1, one hybrid core consisted of polymer resin reinforced by transversely aligned continuous metallic millitube, denoted as "type-I sandwich panel". Another was made of polymer resin reinforced by aligned continuous in-plane metallic millitube, denoted as "type-II sandwich panel". For comparison purposes, traditional sandwich panels with polymeric syntactic foam core "type-III sandwich panel" were also prepared.

Static and impact tests demonstrated that interfacial debonding and subsequent mixed failure by both shear and peel failure in the core could be largely excluded from the type-II panel. Meanwhile, there was a significant transition away from brittle failure (such as occurs with prior art) towards the more preferred ductile failure, i.e., a fracture with a large deformation was observed in type-II sandwich panel provided panels with dramatically enhanced load capacity and impact energy dissipation.

The results indicated that type-II panel comprising layers of structural reinforcements parallel to the sandwich panel face surface provided an appealing option for critical structural applications where the features of debonding resistance and impact tolerance are important.

Furthermore, having identified the surprisingly improved debonding resistance of the Type II panels further embodiments of the invention were developed; such as the embodiments comprising hollow metallic tubes configured in layers with each layer parallel to the surface of the sandwich panel, as exemplified in Examples 2, 3 and 4. Accordingly, the data show impact tolerance of a novel sandwich with metallic hollow millitube grid stiffened polymeric core under both low velocity impact loading (Examples 2, 3 and 4) and ballistic impact loading from gun bullets (Example 4) (In Example 1, both low velocity and hypervelocity ballistic impact testing was performed.)

Accordingly, sandwich panels with reinforcements of hollow metallic tubes configured in layers with each layer parallel to the surface of the sandwich panel were made, i.e., type-II panels as defined herein; with such embodiment the energy absorption was significantly increased due to the ductility of metals as defined herein (such as steel or aluminum, it being understood that non-metallics that possess ductility similar to such metals are within the scope of the invention, e.g., the reinforcements can be metal, alloy, shape memory alloy, ceramic, composites, polymer or polymeric. Preferably, the reinforcements are millitube/microtubes with a diameter of 3 mm or less, 2.5 mm or less, or, 1.5 mm or less.

Weight reduction is an objective with most structural panels, thus the use of metal reinforcements previously has often been deemed inconsistent with the overall purpose of a sandwich material. However, by use of hollow metallic tubes, an increase in weight can be minimized while at the same time producing surprisingly good debonding resistance as well as perforation resistance.

Thus in certain embodiments, (e.g., to provide sandwich panels with desirable and improved debonding resistance and energy absorption under impact loadings) a hybrid sandwich core is provided wherein the core comprises, e.g., hollow metallic millitube grid as a means to stiffen and reinforce a matrix, and where the matrix can, e.g., be a polymer or an shape memory polymer (SMP). Both the matrix and the tubular reinforcements are, respectively, ductile as defined herein. Quasi-static low velocity impact tests and ballistic impact tests demonstrated that such new sandwich panels of the invention provide an appealing option for critical structural applications which need debonding and multiple impact tolerance.

Definitions

"Composite" millitubes are made of composite materials. Preferably, these composite materials have ductility as set forth herein and energy dissipation ability; for example, aluminum alloy, Ni—Ti Shape Memory alloys, steel alloy or fiber reinforced polymer (FRP).

A "continuous fiber" is a type of fiber that covers the entire dimension of a part, with few if any breaks or interruptions.

"Decomposition Temperature ($T_D$)" is defined as a temperature at which chemical bonds are broken or violent oxidation occurs to catch fire.

"Fixed strain" is the difference between the prestrain and the springback. At the end of programming, there is a rebound or springback when the load is removed.

"FRP" is an acronym for fiber reinforced polymer.

"Glass transition temperature ($T_g$)": A parameter of particular interest in synthetic polymer manufacturing is the glass transition temperature ($T_g$), which describes the temperature at which amorphous polymers undergo a transition from a rubbery, viscous amorphous liquid ($T>T_g$), to a brittle, glassy amorphous solid ($T<T_g$). This liquid-to-glass transition (or glass transition for short) is a reversible transition. The glass transition temperature $T_g$ is always lower than the melting temperature, $T_m$, of the crystalline state of the material, if one exists. An amorphous solid that exhibits a glass transition is called a glass. Supercooling a viscous liquid into the glass state is called vitrification. Despite the massive change in the physical properties of a material through its glass transition, the transition is not itself a phase transition; rather it is a phenomenon extending over a range of temperatures and is defined by one of several conventions. Several definitions of $T_g$ are endorsed as accepted scientific standards. Nevertheless, all definitions are arbitrary, and they often yield different numeric results: at best, the defined values of $T_g$ for a given substance typically agree within a few Kelvin.

"Healing Temperature ($T_H$)": The healing temperature can be defined functionally as a preferred temperature above the melting temperature where the thermoplastic molecules further overcome intermolecular barriers and are able to gain mobility and to more effectively diffuse.

A "hybrid core" of a sandwich structure is one comprising a matrix as well as structural reinforcements.

A "matrix" in a hybrid core is the material which generally surrounds and is supported by structural reinforcements; a matrix can be any of a variety of materials, e.g., polymer, metal, glass, or ceramic.

"Melting point ($T_m$)": The term melting point, when applied to polymers, is not used to suggest a solid-liquid phase transition but a transition from a solid crystalline (or semi-crystalline) phase to a still solid amorphous phase. The phenomenon is more properly called the crystalline melting temperature. Among synthetic polymers, crystalline melting is only discussed with regards to thermoplastics, as thermosetting polymers decompose at high temperatures rather than melt. Consequently, thermosets do not melt and thus have no $T_m$.

As used herein, the terms "millitube" and "microtube" are to be seen as interchangeable unless the context clearly indicates otherwise. Generally, millitubes are tubes with an outer diameter of at least a millimeter, and microtubes are tubes with an outer diameter of at least a micron and up to 3 mm or less.

"Prestrain" is the maximum strain applied during programming.

"Relaxation time" is the time elapsed during stress relaxation process.

"Shape fixity" is similar to strain fixity, suggesting that a temporary shape is fixed.

"Shape fixity ratio" is the ratio of the strain after programming over the prestrain.

"Strain" is defined as the change in length over the original length.

"Strain recovery" is the amount of strain that is recovered during shape recovery process.

"Stress" is defined as the internal load per unit area.

"Stress relaxation" is a phenomenon that, once a material is deformed to a certain deformation, the stress continuously reduces while maintaining the strain constant.

"Yield strain" is the strain corresponding to yielding. In the stress-strain curve, the change of slope signals the start of yielding.

BRIEF DESCRIPTION OF THE DRAWINGS

FIG. 7: Schematic of novel microtube grid stiffened foam core. Panel a: a millitube showing cross-sections at A-A and B-B, with B-B being one of the periodic indentations. Panel b: millitubes aligned in longitudinal and transverse directions to form one layer of grid skeleton; with a node, a bay and a rib labeled. A node occurs when two perpendicular millitubes intersect, in each case at the point of the respective periodic indentations. Panel c: perspective view with more layers of perpendicular millitubes added. Panel d: another perspective view of a multiple layer core shown in panel c; Panel e: depiction of a multiple layer core after foam (light grey shading) was poured into the grid skeleton and then cured.

MODES FOR CARRYING OUT THE INVENTION

Figure 1A:
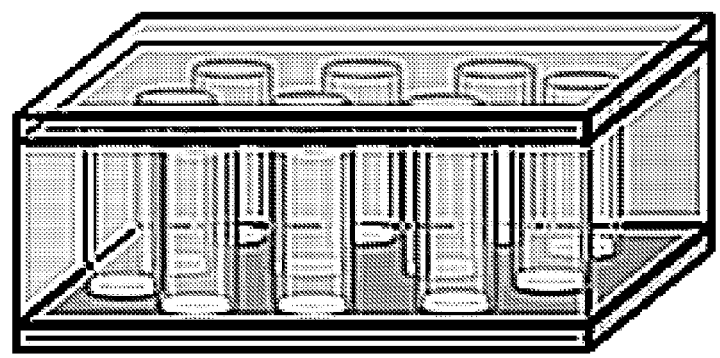
FIG. 1: Typical sandwich panels with different cores: (a) type-I panel with vertically aligned (relative to the surface deemed horizontal) hybrid core; (b) type-II panel with horizontally aligned (relative to the surface deemed horizontal) hybrid core; and (c) type-III panel with traditional syntactic foam.

Sandwich construction has been extensively used in various fields. However, sandwich panels have not been fully exploited in critical structural applications due to the concern of debonding and impact damage. To address these problems, the present invention sets forth a new hybrid core based sandwich panels; such hybrid cores comprise a ductile matrix and ductile tubular reinforcements.

When measured at room temperature, the matrix can be, e.g., polymer, shape memory polymer, metal, glass or ceramic. Regardless of the material, the matrix is ductile, having elongation at break in a range of about (3-200%); and preferably having properties of elastic modulus in a range of about 1.5-350 GPa, ultimate tensile strength in a range of about 25-350 MPa and elongation at break in a range of about (3-200%). In alternative embodiments, an elastic modulus is in a range of about 2-4 GPa and a yielding strength is in a range of about 30-135 MPa. Thus, these ranges relate to either a thermosetting or thermoplastic polymer matrix, e.g., a typical thermosetting polyester's ultimate tensile strength is 34.5-130 MPa, and a typical thermoplastic polymer's ultimate tensile strength is 70-105 MPa. In one embodiment, properties of elastic modulus, ultimate tensile strength and elongation at break of about 2.76 GPa, 30 MPa and 3.5%, such as for LOCTITE Hysol 9460.

The structural reinforcements are tubular, it being understood that hollowness can achieve an advantage of weight savings, and as set forth herein have an advantage of facilitating impact energy absorption. Further, the reinforcements are ductile having elongation at break in a range of about (3-100%); and preferably an elastic modulus is in a range of about 1-1000 GPa and the ultimate tensile strength is in a range of 1-1000 MPa, and elongation at break in a range of about 3-100%. In alternative embodiments, an elastic modulus is in a range of about 1-210 GPa and ultimate tensile strength is in a range of about 80-775 MPa. Thus, these ranges relate to either an aluminum or steel millitube, e.g., a typical aluminum millitube's ultimate tensile strength is 86-265 MPa, and a typical steel millitube's ultimate tensile strength is 500-760 MPa in room temperature. In one embodiment, elastic modulus, ultimate tensile strength, and elongation of aluminum tube are 14.5 GPa, 121.2 MPa, and 3.01%; elastic modulus, ultimate tensile strength, and elongation of steel tube are 36.4 GPa, 527 MPa, and 65%, respectively.

As set forth in Example 1 below, results demonstrated for example that: (i) interfacial debonding at or near the face sheet/core were largely excluded from type-II panels with horizontally aligned millitubes; (ii) as contrasted with the brittle failure that occurred in the traditional syntactic foam cored sandwich panels, significant ductile failure was achieved in type-II panels of the invention; and (iii) the compressive strength, flexural strength, and impact response of type-II panel with the hybrid core showed dramatic enhancements over the traditional syntactic foam-cored sandwich panel.

This work indicated that type-II panels are an option for critical structural applications requiring debonding resistance and/or impact tolerance.

Moreover, as set forth in Example 2 disadvantages of prior art continuous fiber reinforced grid skeletons that contain glass fibers were overcome by embodiments of the invention that comprised a hybrid core reinforced with ductile structural units or elements aligned in a grid configuration. These embodiments retained the favorable debonding characteristics of the type-II panels of Example 1, while concomitantly exhibiting substantially improved impact resistance characteristics. Accordingly, ductile reinforcements comprising hollow metallic tubes configured in non-unidirectional layers such that each layer is essentially parallel to the surface of the sandwich panel yet each adjacent layer is not directed in the same direction as its neighbor; typically the adjacent layers were aligned in a direction 90° shifted from its adjacent neighbor, creating a grid. Advantageously, with such "grid" embodiments the energy absorption was significantly increased as was impact resistance.

EXAMPLES

Figure 1B:
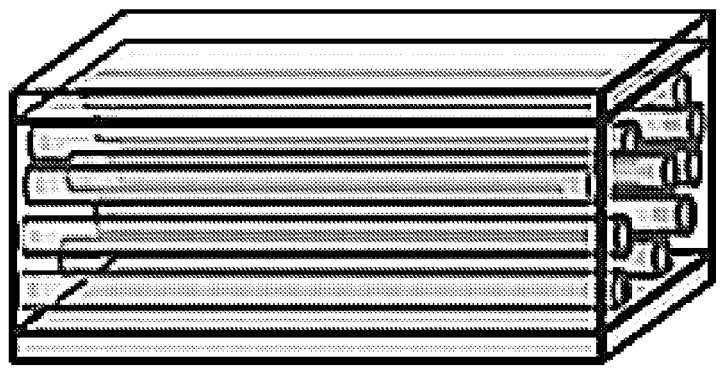
Figure 1C:
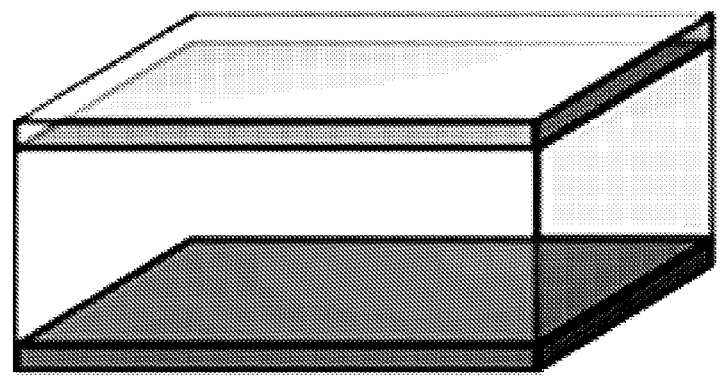

Example 1: Comparison of Sandwich Panels with Either in-Plane or Out-of-Plane Metal Tube Reinforced Foam Core In this example, two types of hybrid cores and one traditional syntactic foam core were evaluated. The first hybrid core consisted of vertically (transverse relative to the surface plane) aligned metallic millitubes and polymer resin, which was denoted by type-I core (the corresponding sandwich panel was denoted by type-I panel). The type-I core is illustrated in FIG. 1a. The second hybrid core consisted of horizontally (in-plane with that of the surface) aligned metallic millitubes and polymer resin which was denoted by type-II core (the corresponding sandwich panel was denoted by type-II panel). The type-II core is shown in FIG. 1b. A traditional syntactic foam core (glass microballoon based) was selected as the reference, denoted as type-III core (the corresponding sandwich was denoted by type-III panel). The type-III core is plotted in FIG. 1c.

Materials

The face sheets of all three types of sandwich panels were made of laminated composite plate. The composite plate was prefabricated by bi-directional woven glass fabric reinforced vinyl ester resin with a uniform thickness of 3.2 mm (⅛ inch), (Industrial Plastic Supply, Inc., Anaheim, Calif.). The volume fraction of the glass fiber in these face sheets was 55%. The density of the composite plate face sheet was about 1.75 g/cm$^3$. The elastic moduli of the composite plate face sheet were 18 GPa, 16 GPa, and 5.5 GPa along direction one, direction two and direction three, respectively. Direction one was aligned to the wrap direction, direction 2 was the weft direction, and direction 3 was the transverse direction.

The metallic millitubes for the hybrid cores (type-I and type-II cores) were made of aluminum 6061-T6. The elastic modulus and yielding strength of the aluminum tube were 72 GPa and 120 MPa, respectively. The measured inner diameter and outer diameter of the aluminum millitube were 1.78 mm and 2.38 mm, respectively. Thus, this particular example demonstrates the efficacy of the invention, e.g., when the structural reinforcement is a metallic millitube. It is to be noted that in accordance with the present invention the particular material used as a structural reinforcement does not matter so long as the respective reinforcement unit possesses characteristics such as those set forth herein; e.g., the reinforcements can be metal, metallic, ceramic, composites, polymer or polymeric.

LOCTITE Hysol 9460, an epoxy based structural resin was used in all three types of sandwich cores. (Henkel Corporation, Dusseldorf, Germany). The density of the epoxy resin was 1.31 g/cm$^3$. According to the manufacturer's test data, the elastic modulus, tensile strength and elongation at break were 2.76 GPa, 30 MPa and 3.5%, respectively. The syntactic foam core (type-III core) was made of glass microballoons and the epoxy resin (LOCTITE Hysol 9460). The glass microballoons (Ellsworth Adhesives, Germantown, Wis.) had an effective density of 0.14 g/cm$^3$ with particle diameter range of 5~200 μm. The average outer diameter and wall thickness of the glass microballoons were 85 μm and 0.8 μm, respectively.

Specimen Preparation

The three types of sandwich panels were fabricated with two face sheets and the corresponding sandwich core. The only difference between type-I and type-II sandwich panels was the aligning pattern of the aluminum millitubes in their cores as mentioned before. In the current study, the volume fraction of aluminum millitubes was 40% (the remaining 60% was the epoxy resin) for both type-I and type-II cores. Therefore, the two hybrid cores had the identical density of 1.26 g/cm3. The volume fraction of glass microballoons in the type-III core (syntactic foam core) was also 40%, and the remaining 60% was the epoxy resin. Hence, the theoretical density of the syntactic foam core was about 0.84 g/cm$^3$.

For all test configurations, the heights of the core and the entire sandwich panels were 12.3 mm and 18.7 mm, respectively. Therefore, the density (including core and face sheets) of type-I and type-II sandwich panels was 1.41 g/cm3, and the density of type-III sandwich panel was 1.13 g/cm$^3$. It is noted that the millitube phase only contributed 37% to the entire density of the type-I and type-II sandwich panels.

The procedure for preparing type-I and type-II hybrid cores were identical. The aluminum millitubes were first stacked in a mold by inserting the tubes into orifices in the side walls of the mold before infusing the polymer resin. The polymer resin was then infused into the millitube preform by an optional Resin Infusion Molding (RIM) or Vacuum Assistance Resin Infusion Molding (VARIM) system, depending on the viscosity of polymer [20]. In VARIM, vacuum is applied to the outlet of a mold, and resin is drawn into the mold by vacuum only, in accordance with methodologies known in the art (see, e.g., [20]). After curing at room temperature, the cast cores were demolded and post-cured (55° C. for 4 hours). The surfaces of the hybrid core were ground and cleaned before applying the skins. The prefabricated laminated face sheets (E-glass/vinyl ester) were then bonded to the hybrid cores with the identical polymer resin (LOCTITE Hysol 9460) to form the respective sandwich panels.

It is noted that the mass production of the hybrid cores can be easily realized using the existing equipment and procedures in the composite industry. Therefore, ease of mass production is an advantage of the instant sandwich panels.

Geometry and Test Configuration

All three types of sandwich panels were subjected to three types of tests: (i) static compression tests; (ii) static three-point bending test (simply supported at two ends); and (iii) central point impact test (simply supported at two ends).

In the static compression tests, all type-I, type-II, and type-III sandwich panels were 25.4 mm long, 25.4 mm wide and 18.7 mm thick (all cores are 12.4 mm thick). In the static three-point bending tests, all sandwich panels were 101.6 mm long (with a test span of 90 mm), 25.4 mm wide and 18.7 mm thick (all cores were 12.4 mm thick). For the static compression and bending tests, strain controlled loading mode was employed using MTS 810 machine (MTS Systems Corporation, Eden Prairie, Minn.) with a loading rate of 1.5 mm/min.

The impact tests were conducted by the Instron Dynatup 8250 HV Impact testing machine (Instron Industrial Products, Grove City, Pa.) with a hemi-sphere tup nose (the diameter is 12.7 mm). All type-I, type-II, and type-III sandwich panels were 101.6 mm long, 25.4 mm wide and 18.7 mm thick (identical dimensions with the bending test specimens). The initiation energy and propagation energy were calculated using a data acquisition system integrated in the impact test machine. An identical impact velocity of 4 m/s was used for all types of sandwich panels. However, two different hammer weights were considered: 25 kg hammer was used for type-I and type-II panels, and 5 kg hammer was used for type-III panels, respectively. The type-III panel was very brittle and crack start initiation and propagation occurred by using a hammer of only 5 kg. When the 25 kg hammer was used the type-III panel became crushed, and thus there were no test results.

Results

Figure 2:
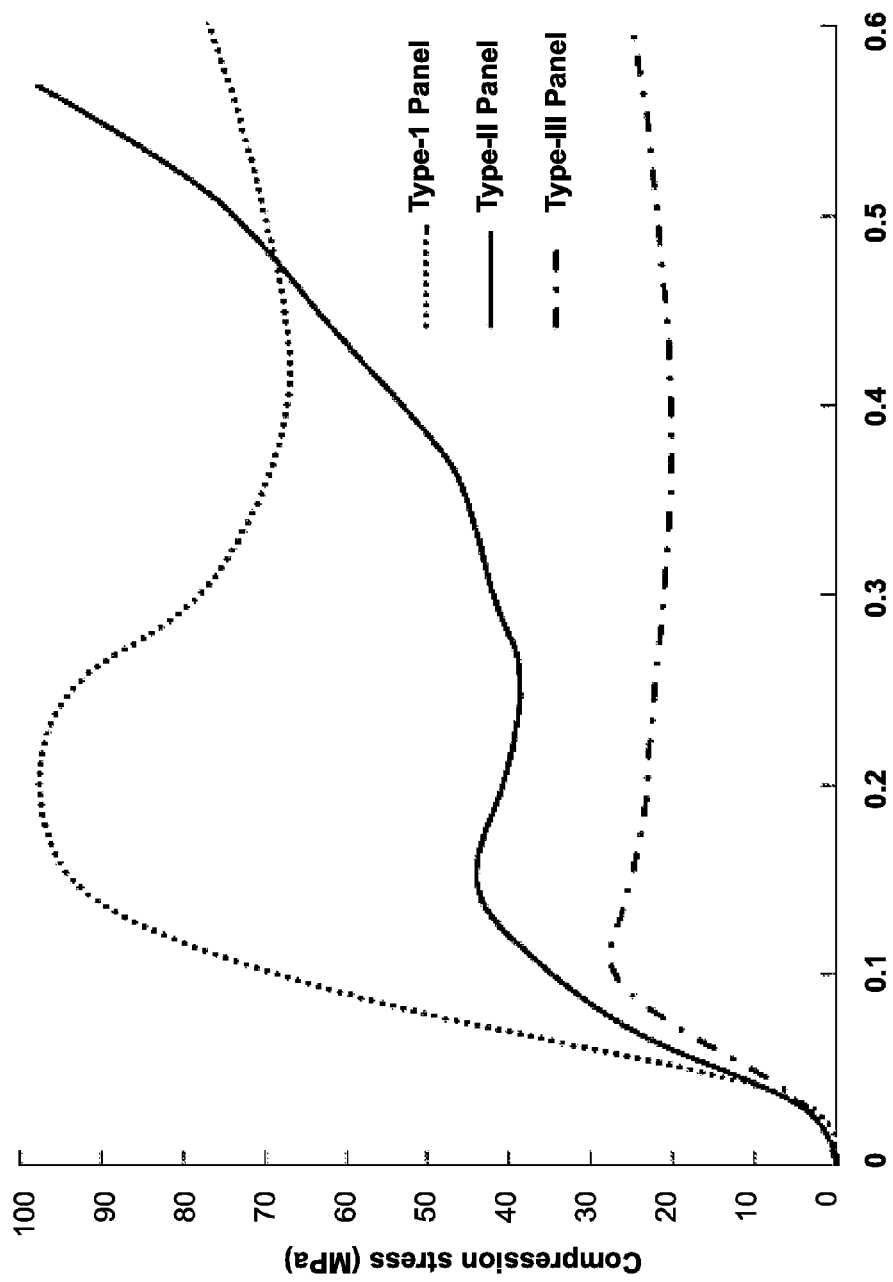
FIG. 2: Typical compressive strain-stress curves of the three types of sandwich panels with different cores. Type-1 panel (••••••); Type-2 Panel, (———) Type-3 panel, (–·–·–·–).

The typical compressive strain-stress curves of the three types of sandwich panels are plotted in FIG. 2. One can see that the type-I sandwich panel had the highest compressive strength, which was near 100 MPa. The type-II sandwich panel had the intermediate compressive strength, which was near 45 MPa. The type-III sandwich panel had the lowest compressive strength, which was only about 27 MPa.

Figure 3:
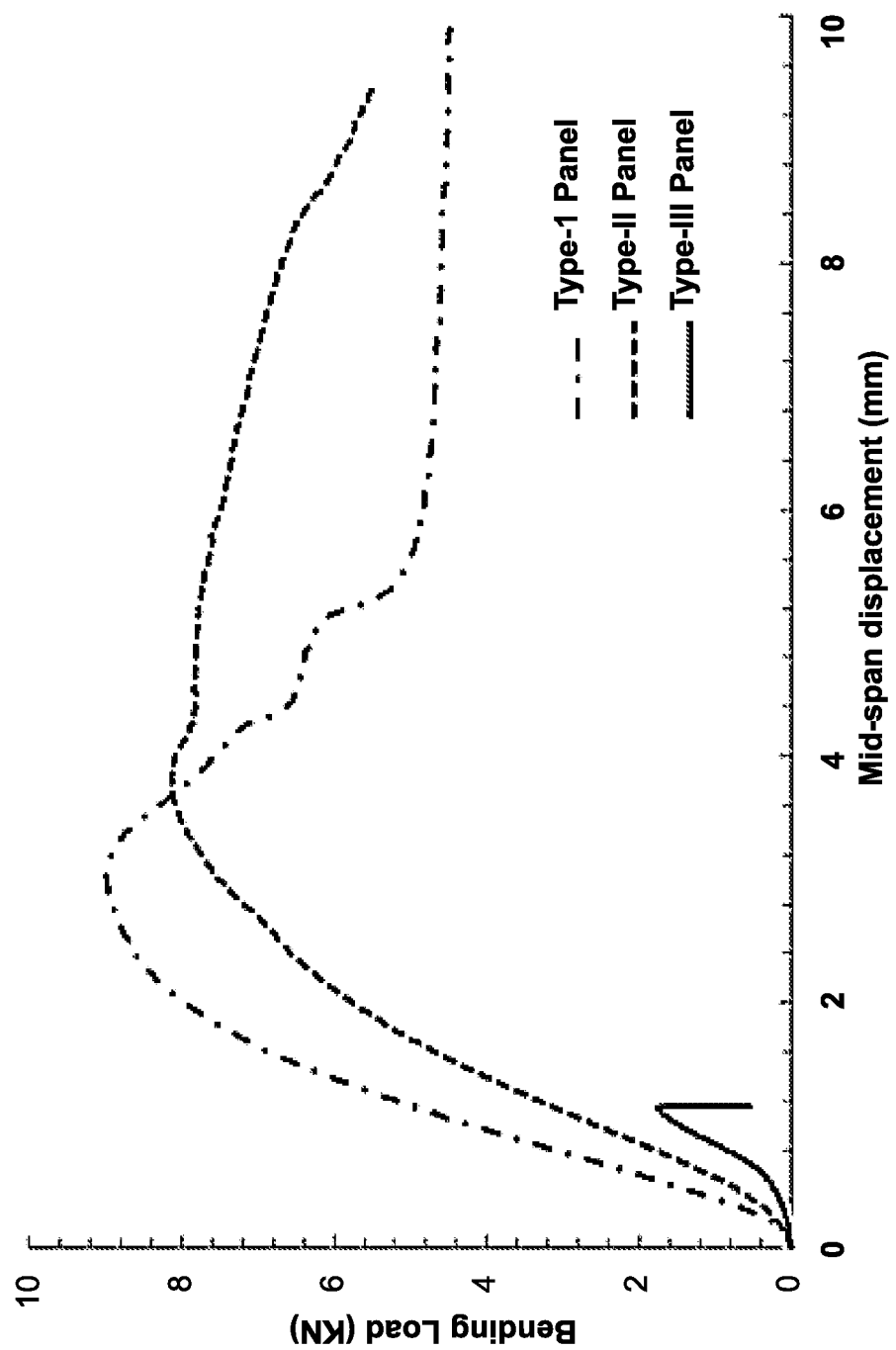
FIG. 3: Typical bending deflection-force curves of the three types of sandwich panels with different cores. Type-1 panel, (-●-●-●-); Type-2 panel (●●●●●) Type-3 Panel, (———).

The typical bending load-deflection curves of the three types of sandwich panels are plotted in FIG. 3. The flexural strength of type-I and type-II sandwich panels were about as 510% and 460% as that of type-III sandwich panel, respectively. The two types of panels with hybrid cores (type-I and type-II panels) have comparable flexural (bending) strengths, although type-I panel has higher compressive strength than that of type-II panel.

Figure 4A:
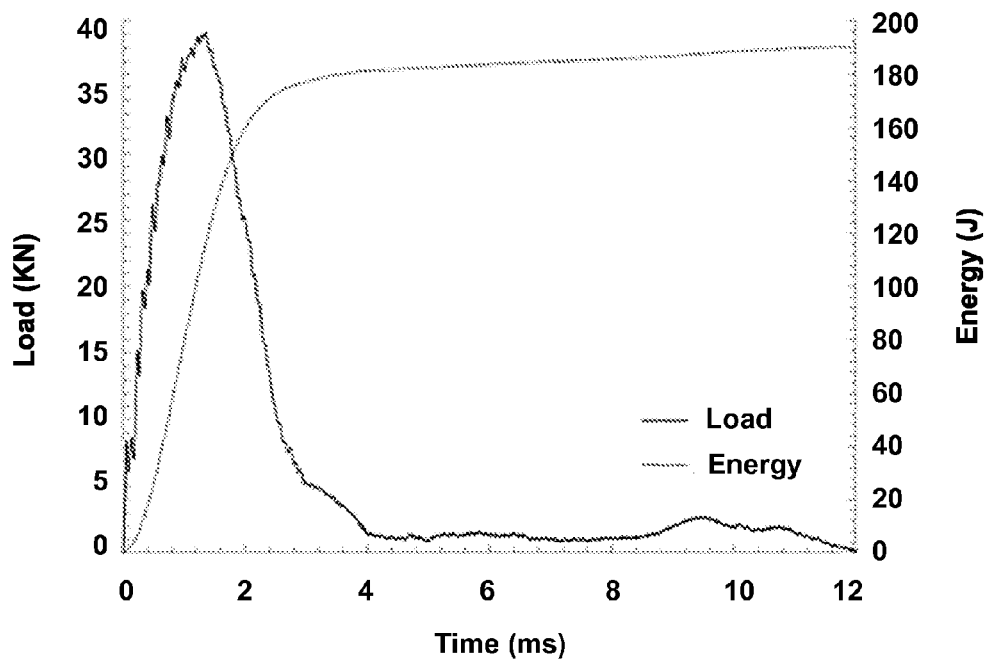
FIG. 4: Impact response of different types of sandwich panels with different cores: (a) type-I panel; (b) type-II panel; and (c) type-III panel
Figure 4B:
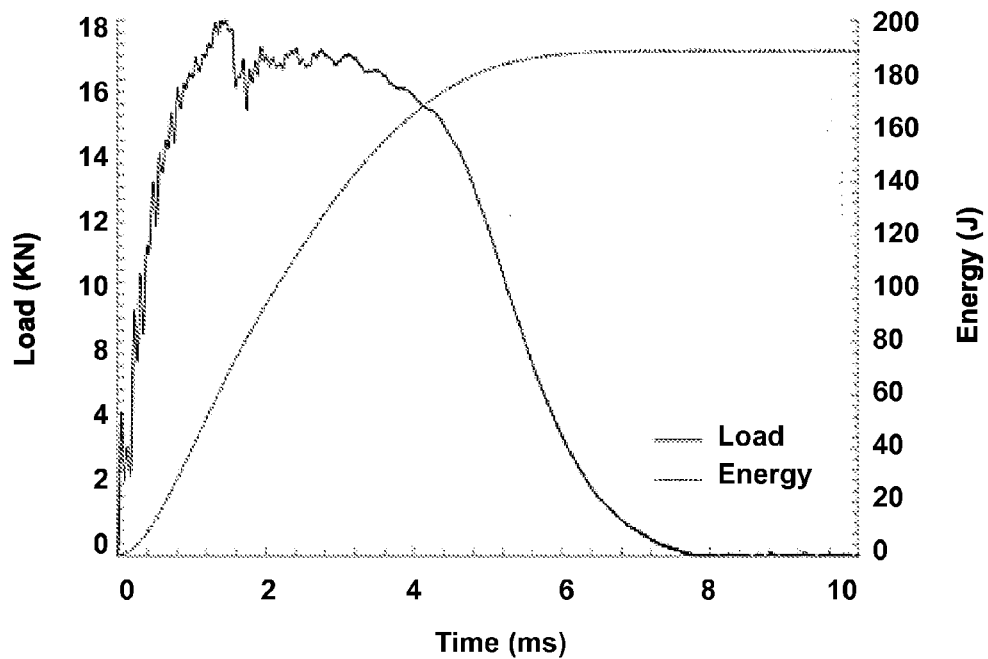
Figure 4C:
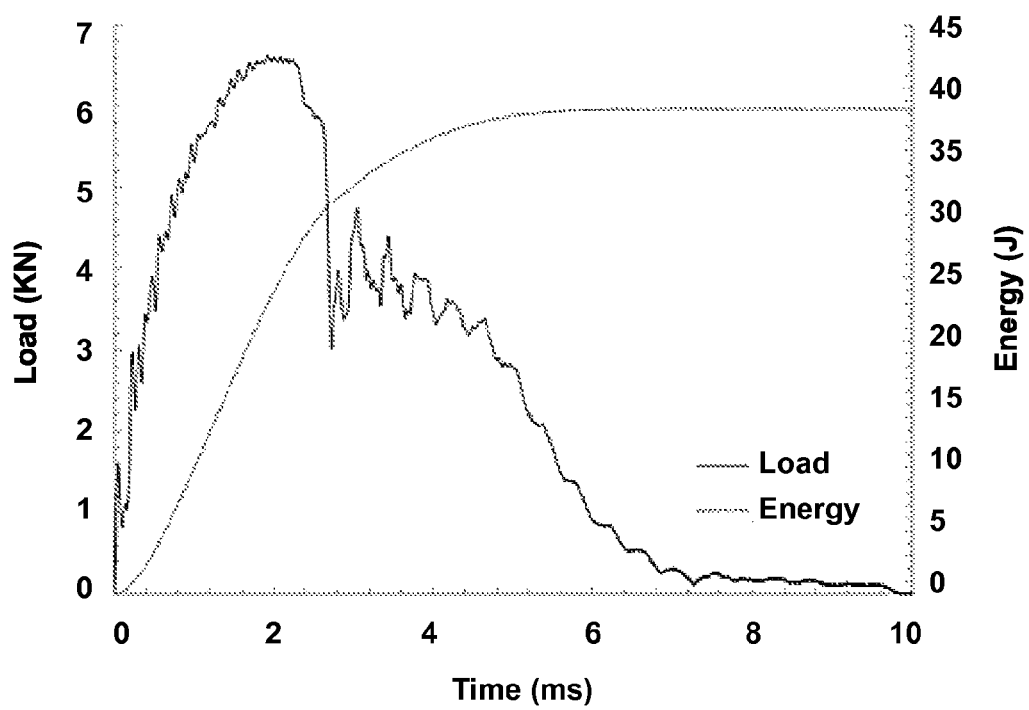

Pursuant to the impact testing, the typical load-time and energy-time responses of the three types of sandwich panels under impact loadings are shown in FIG. 4a, FIG. 4b, and FIG. 4c, respectively. Meanwhile, the peak load, initiation energy and propagation energy of the three types of panels under impact loadings are listed in Table 1.

TABLE 1

Test results of the two types of sandwich panels with different cores

| Types of specimens | Peak impact load (KN) | Initiation energy (J) | Propagation energy (J) | Maximum bending load (N) | | Residual capability (%) |
|---|---|---|---|---|---|---|
| | | | | Before impact | After impacts | |
| Type-I sandwich panel | 38.5 | 98.1 | 91.9 | 9,010 | N.A. | N.A. |
| Type-II sandwich panel | 18.0 | 59.5 | 130.5 | 7,960 | 6,010 | 75% |
| Type-III sandwich panel | 6.6 | 24.0 | 14.5 | 1,700 | 0 | 0% |
| Specific property ratio I/III | 446.7% | 326.9% | 507.0% | 426.2% | N.A. | N.A. |
| Specific property ratio II/III | 218.2% | 198.3% | 720.1% | 376.5% | N.A. | N.A. |

The impact energy corresponding to the maximum impact force (i.e., the peak force in the impact force-time curve) is defined as initiation energy. Propagation energy is defined as the difference between the maximum impact energy and the initiation energy. These definitions have been used previously [22]. It has been suggested that the initiation energy is basically a measurement of the capacity for the target to transfer energy elastically and higher initiation energy usually means a higher load carrying capacity; on the other hand, the propagation energy represents the energy absorbed by the target for creating and propagating gross damage. Generally, conventional sandwich panels with higher propagation energy have lower residual load carrying capacity because the absorbed impact energy by the panels has been used to create damage in a detrimental way, such as core/face sheet interfacial debonding. However, a sandwich panel of the invention has higher propagation energy, but still has higher residual load carrying capacity because the damaging energy has been handled in a less detrimental way, such as by matrix microcracking, rather than debonding or complete material failure.

DISCUSSION

Specific Mechanical Properties:

Note that the results are also given in terms of specific properties in Table 1. For instance, the specific peak impact load is defined as the peak impact load per weight of the material. Although type-I and type-II panels were slightly heavier than type-III panel, the specific properties of the proposed hybrid foam based panels was significantly higher than that of the traditional syntactic foam based panel, which exemplified the excellence of the hybrid cores set forth herein.

Figure 5A:
FIG. 5: Experimental observation of type-II panel after impact loading: (panel a) shows intact micro-scale local skin/core bonding; (panel b) minor debonding at millitube/matrix interface; (panel c) global deformation; (panel d) excellent bonding at millitube/matrix interface
Figure 5B:
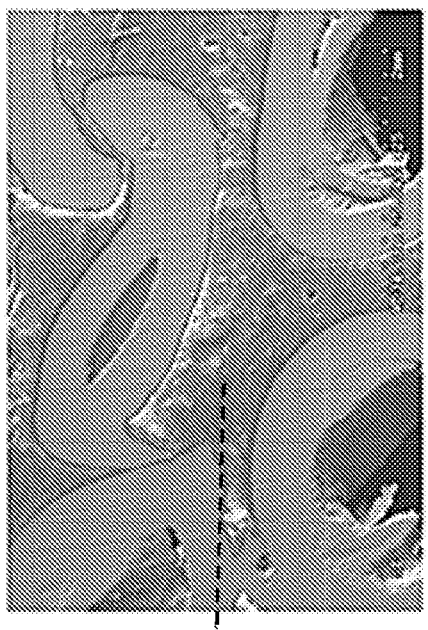
Figure 5C:
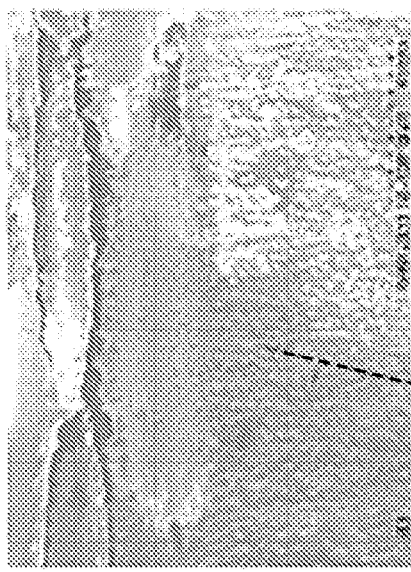
Figure 5D:
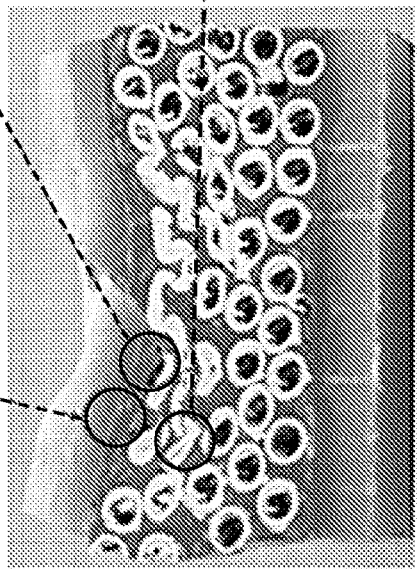

Interfacial Debonding:

A typical interfacial debonding in type-III sandwich panel (with syntactic foam core) was observed under both static and impact loading conditions. This interfacial debonding immediately caused the failure of the entire sandwich panel. For type-I sandwich panels (with vertically aligned hybrid core), a typical interfacial debonding was observed due to the stress concentration and the insufficient interfacial bonding area. Although the areas are the same in all specimens, because Type III added 40 vol. % microballoons, these balloons make the contact area insufficient. However, for the Type-II sandwich panels as shown in FIG. 5a, there was almost no interfacial debonding locally after the impact loadings. Only some micro-scale debondings between the millitubes and matrix were observed as shown in FIG. 5b, while most millitube/matrix interfacial bondings were still very good (see FIG. 5c and FIG. 5d). A significant ductile deformation and failure mode were observed which is, in fact, an advantage because of the reinforcement metallic millitubes' material properties. It is believed that the horizontally aligned hollow millitubes provide the flexibility to the sandwich panel by allowing large deformation and plastic deformation and squeeze within the millitubes. The Type-II sandwich panel was found to have excellent flexibility and strongly suppressed the interfacial debonding of the face sheet.

Figure 6A:
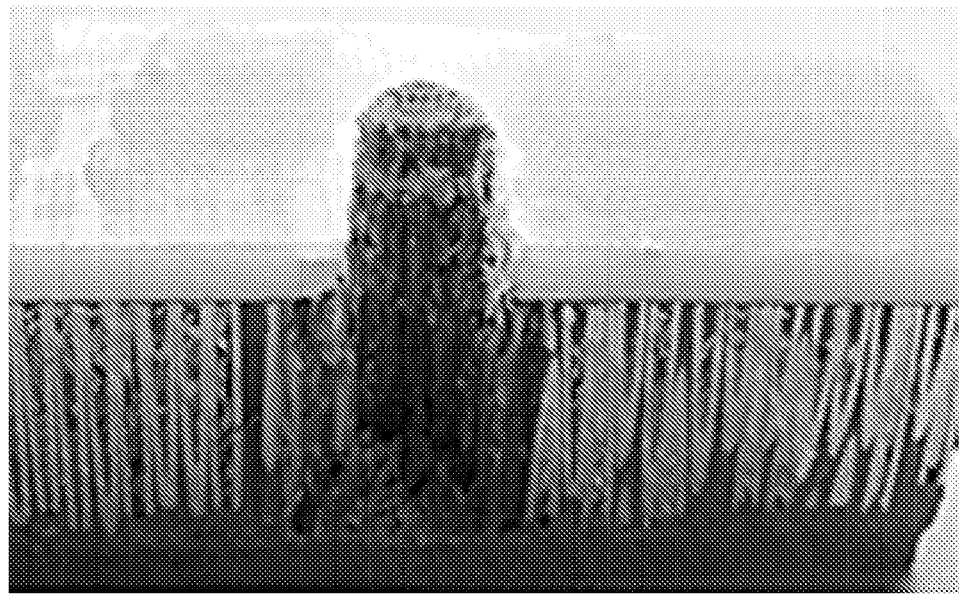
FIG. 6: Impact failure mode of panels with hybrid core: (a) type-I panel; and (b) type-II panel
Figure 6B:
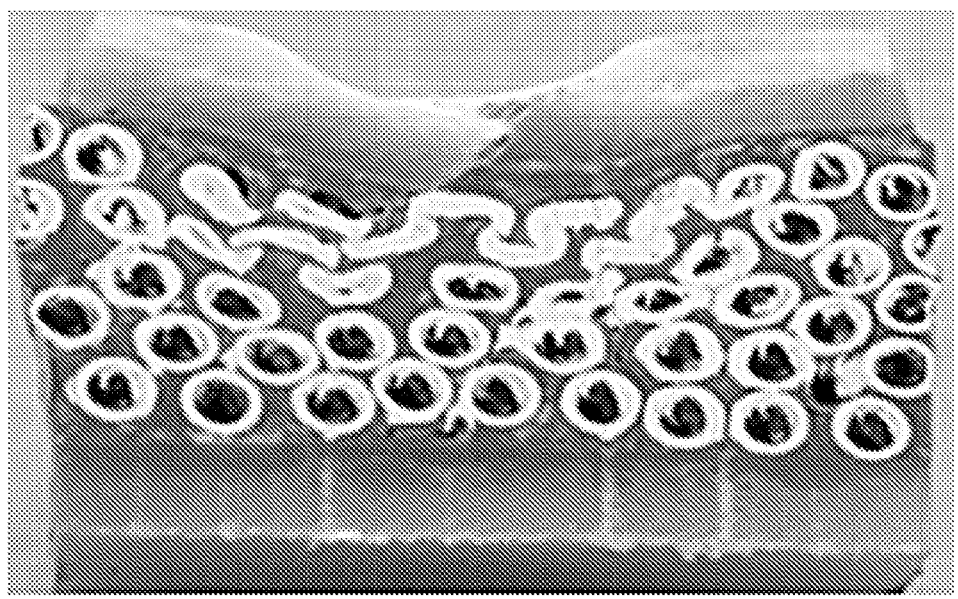

Impact Failure Mode:

When the type-I panels (with vertically aligned hybrid foam core) were subjected to an impact loading, a large impact hole was created. This impact hole caused a significant loss of face sheet and core material as shown in FIG. 6a. Meanwhile, some visible interfacial debondings occurred between the face sheet and core after the impact. The type-III panel (with traditional syntactic foam) immediately failed after the impact due to the interfacial debonding. However, when subjected to the impact loadings, the type-II panels represent excellent flexibility and energy absorption ability. The plastic deformation of the aluminum millitubes become the dominant contributor of absorbing impact energy, and most energy dissipations are assigned to the metallic millitubes. This mechanism protects the polymer matrix from brittle crazing even the matrix is quite brittle (with only about 3.5% maximum elongation). It is also noted that the first few rows of the horizontally aligned millitubes in the type-II panel also act as a cushioning layer to protect the interface between the core and front face sheet. According to our observation, almost no interface debonding occurred in the type-II specimen as shown in FIG. 6b. As a particular advantage, type-II embodiments provide a solution to the interface debonding problem which is a major concern in the traditional foam cored sandwich structures.

Post-Impact Performance:

The post-impact performance for the critical structural members is an important consideration. When the type-I panels (with vertically aligned hybrid foam core) were subjected to an impact loading, a large impact hole was created (see FIG. 6a). This impact hole caused a significant loss of face sheet and core material. As a result, the residual structural capacity of the type-I panel after impact becomes very limited. When subjected to an impact loading, the type-III panels (with traditional syntactic foam) immediately failed. As a result, type-III panel lost all the structural capability after the impact. In contrast, after being subjected to two impact loadings, the type-II panels (with horizontally aligned hybrid foam core) still retained 75% of the load capacity even though their front face sheet has been severely damaged. This superior post-impact performance of type-II embodiments is highly desirable and it can dramatically improve the reliability of structural members.

Example 2: Sandwich Panels with Metal Tube Grid as Reinforcement of a Foam Core

In this example, a type-II panel embodiment comprising a metallic millitube grid that reinforces a polymer cored sandwich panel is set forth. The new core of this Example is a hybrid core comprising hollow metallic millitubes in the form of a grid. This differed from the type-II core embodiment of Example I in that the core here comprised a polymer resin reinforced by metallic millitubes which are now in a grid configuration rather than all millitubes in parallel as in Example 1. Low velocity impact testing demonstrated that the new grid panel is an option for critical structural applications where features such as debonding resistance and multiple impact tolerance are important.

It was found that by filling the empty bays in the grid skeleton with syntactic foam (the same polymer resin as in Example 1), the resulting composite sandwich was an advantageous structure for impact mitigation because (1) each cell is a small panel or mini-structure with elastic boundaries, it thus tends to respond to impact quasi-statically; (2) the periodic grid skeleton, the primary load carrying component with 2-D continuity, is understood to be responsible for transferring the impact energy elastically and providing the in-plane strength and transverse shear resistance; (3) the extremely light-weight syntactic foam in the bay, the secondary load carrying component, is understood to be primarily responsible for absorbing impact energy through damage; (4) the grid skeleton and the foam together are understood to develop a positive composite action, i.e., the grid skeleton confines the foam to increase its strength and the foam provides lateral support to resist rib local buckling and crippling. In addition, the foam is understood to provide further in-plane shear strength for bi-grids such as orthogrids; and (5) the core and skin can be fully bonded because the bay is fully filled, without the limitations that come with web cores. In embodiments of the invention, a web core is a core having connected rods with large connected open space; a foam core is a core with small connected space (open-celled foam) or discrete voids (syntactic foam). In other words, web core has less bonding area with the face sheet (correlating with more debonding) while foam core has large bonding area with the face plate.

Materials:

The face sheets of sandwich panels were conventional, and made of laminated composite plate. (Industrial Plastic Supply, Inc., Anaheim, Calif.) The composite plate was prefabricated by bi-directional woven glass fabric reinforced vinyl ester resin with a uniform thickness of 3.2 mm (⅛ inch). Upon measuring the face sheet material it was found that the volume fraction of the glass fiber was 55% and 45% of the volume fraction was the polymer.

The density of the composite plate face sheet was about 1.75 g/cm$^3$. The elastic moduli of the composite plate face sheets were 18 GPa, 16 GPa, and 5.5 GPa along direction one, direction two and direction three, respectively. Direction 1 was aligned to the warp direction, direction 2 was the weft direction, and direction 3 was the transverse direction.

The hollow metallic millitubes for the grid stiffened cores were made of stainless steel (K & S Precision Metals, Chicago, Ill.). The elastic modulus and yielding strength of the steel tube were found to be 205 GPa and 170 MPa, respectively. Upon measuring the inner diameter and outer diameter of the aluminum millitubes were found to be 1.92 mm and 3.15 mm, respectively.

LOCTITE Hysol 9460 (Ellsworth Adhesives, Germantown, Wis.), an epoxy based structural resin was used in all three types of sandwich cores (type-I, type-II, type-III as defined herein). The density of the epoxy resin was 1.31 g/cm$^3$. According to the manufacturer's test data, the elastic modulus, tensile strength and elongation at break were 2.76 GPa, 30 MPa and 3.5%, respectively.

Specimen Preparation:

The steel millitubes were first extruded by using a mold to create equidistant indentation (every 8.0 mm), as shown in FIG. 7a. The millitubes were assembled together, as FIG. 7b shows. After more layers were added, the adhesive resin was then infused into the millitubes preform as shown in FIG. 7c-d, by a Resin Infusion Molding (RIM) system following conventional methodologies (see, e.g., [20]). After curing at room temperature, the cast cores were demolded and postcured (55° C. for 4 hours). The surfaces of the grid stiffened cores were ground and cleaned before applying the skins. The prefabricated laminated face sheets (E-glass/vinyl ester) were then bonded to the cores with the same polymer resin (LOCTITE Hysol 9460) used to form the sandwich panel. In alternative embodiments of the invention, there will generally be more than one layer, e.g., 2, 3, 4, 5, 6, 7, 8, 9, 10, 11, 12, 13, 14, 15 or more layers. Any upper limit of layers will, as understood by those of ordinary skill, depend on desired properties such as sandwich weight or thickness (e.g., a panel of the invention when used as vehicle/structural armor may be at least 10, 20, 30, 40, 50, 60 70, 80, 90 or 100 cm in thickness).

Figure 8:
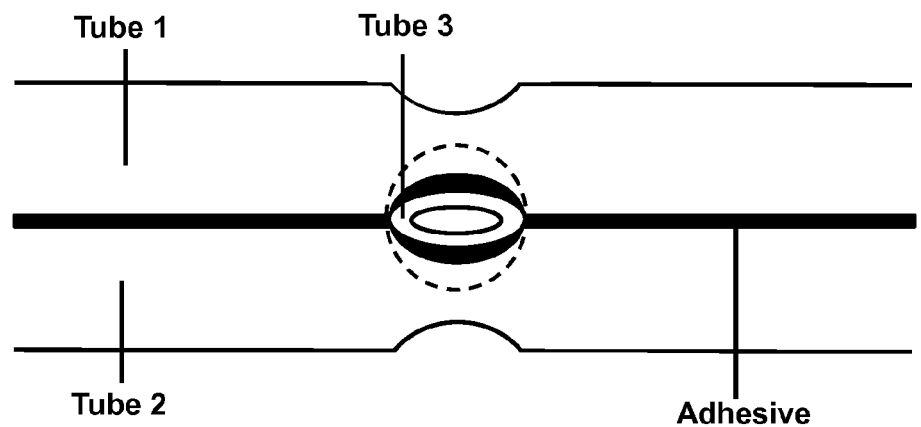
FIG. 8: Schematic of two longitudinal tubes (tube 1 and tube 2) intersecting with one transverse tube (tube 3) at the pre-indented location thereby creating a "node". The presence of optional adhesive is depicted by the solid black areas between the various tubes. Another optional approach to assembling tubes is to weld them at the "node" area.

The cross section of grid stiffened millitubes was shown in FIG. 8 where it is seen that each of the millitubes was mechanically interlocked with other millitubes. Accordingly, when the sandwich panel was subjected to an impact load, the impact energy could be transferred from the local impact point to the whole sandwich panel. Therefore, the impact energy and impact wave could be absorbed by the integrated grid stiffened sandwich structure.

Of note, mass production of the hybrid cores can be easily realized using the existing equipment and procedures in the composite industry. Therefore, ease of mass production is an advantage of the sandwich panels set forth herein.

In this example, three layers of grid stiffened steel millitubes were fabricated with 40% volume fraction of millitubes (the rest 60% was the epoxy resin) for the cores. Therefore, the grid stiffened cores had the density of 1.65 g/cm$^3$.

Geometry and Test Configuration

The type-II sandwich panels were subjected to central point impact test (simply supported at two ends). The impact tests were conducted by the Instron Dynatup 8250 HV Impact testing machine with a hemi-sphere tup nose (the diameter is 12.7 mm). (Instron Corporation, Norwood, Mass.) Sandwich panels were 101.6 mm long, 25.4 mm wide and 20.5 mm thick. The initiation energy and propagation energy were calculated using a data acquisition system integrated in the impact test machine.

With a 4 g bullet with 308 m/s initial velocity at impact on armor, the total impact energy is around 190 J. Therefore, in order to simulate such bullet and velocity in this study, 25 kg hammer with impact velocity of 3.9 m/s was used for this experiment and created 190 J impact energy for the sandwich panels. Three specimens were tested with this low velocity impact load (3.91 m/s).

Results and Discussion

Figure 9:
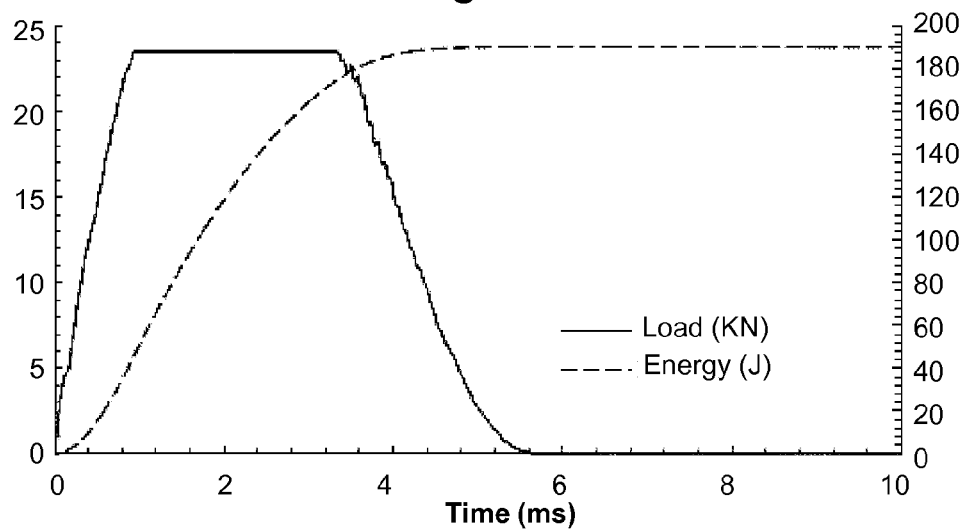
FIG. 9: Impact response of sandwich panels set forth in Example 2.

The typical load-time and energy-time responses of the sandwich panels under impact loadings are shown in FIG. 9. Meanwhile, the average of peak load, initiation energy and propagation energy of the panels under impact loadings are listed in Table 2.

TABLE 2

| Average of impact test results of the sandwich panels | | | |
|---|---|---|---|
| Maximum load (kN) | Impact velocity (m/s) | Initiation Energy (J) | Propagation Energy (J) |
| 23.5103 | 3.9186 | 48.521 | 143.629 |

Impact energy corresponding to the maximum impact force was defined as initiation energy. Propagation energy was defined as the difference between the maximum impact energy and the initiation energy. These definitions had been used previously [23]. It had been suggested that the initiation energy was basically a measurement of the capacity for the target to transfer energy elastically and higher initiation energy usually mean a higher load carrying capacity; on the other hand, the propagation energy represented the energy absorbed by the target for creating and propagating gross damage.

Interfacial Debonding:

For the type-II grid sandwich panel embodiments used in this Example, no interfacial debonding was observed. Only some micro-scale debonding between the millitubes and matrix were observed after impact, while, most millitubes/matrix interfacial bondings remained intact. Without being bound by theory, it is presently understood that the grid-configured hollow millitubes (or other configurations of alternative structural units/elements possessing physical properties of the grid-configured hollow millitubes, such as a millifilament grid) provide flexibility to the sandwich panel by allowing large deformation along with integrated mechanical interlock within the grid. This embodiment also had excellent impact energy absorption. Compared with other types of core, this grid stiffened core reduced local impact damage by rapidly transferring the local impact energy to the whole structure; further this embodiment strongly suppressed the interfacial debonding near the face sheet. Thus, this embodiment provides a solution to the interface debonding problem which has previously been a major concern in the traditional foam cored sandwich structures.

Impact Failure Mode:

As a result of the impact testing the grid-stiffened sandwich panels were not broken into pieces, they suffered no impact windows, and were not bent to any appreciable extent. Only an impact indentation could be seen on the top view However, a big circular area could be found on the bottom, which was an impact effect area. Comparing the diameter of the impact effect area and the diameter of the impact indentation area, it was found the impact effect area was 40 times that of the impact indentation area, which indicates that the impact force was transferred in a large area due to stress wave propagation throughout the grid skeleton.

Based on SEM observation it was seen that when subjected to the impact loadings, initially the impact energy and impact wave were spread or distributed from the face sheet to the sandwich core locally, and then passed the first layer of grid stiffened steel millitubes and caused plastic deformation of local grid stiffened millitubes and surrounded matrix; subsequently, the impact energy and impact wave were further distributed and absorbed layer by layer due to the mechanical interlock of grid-stiffened structure; finally, the remaining weakened impact energy and impact wave were absorbed by the bottom sheet of the sandwich panels manifest as an impact effect area.

Thus, the grid-stiffened type-II sandwich panels manifest excellent flexibility and energy absorption ability. Based on SEM observation it was seen that plastic deformation of the grid stiffened steel millitubes becomes the dominant contributor of absorbing impact energy and impact wave, and most energy dissipations were assigned to the grid stiffened metallic millitubes and surrounded matrix. This mechanism protects the polymer matrix from the brittle crazing even the matrix is quite brittle (with only about 3.5% maximum elongations).

Conclusions

Sandwich construction has been extensively used in various fields. However, sandwich panels have not been fully exploited in critical structural applications due to the concern of debonding and impact damage. To address these problems, new grid stiffened hollow millitube core based sandwich panels were developed as set forth herein. The test results demonstrated: (i) the interfacial debondings at or near the face sheet/core were improved by the new grid stiffened millitube-based sandwich panels; (ii) rather than the brittle failure which occurs in the traditional syntactic foam core panels, significant ductile failure was achieved in the new sandwich panels; and (iii) these new millitube grid-stiffened sandwich panels could stand repeated impact damage. This data indicated that the new sandwich panels are an option, e.g., for the critical armor applications requiring debonding and multiple impact tolerance.

Example 3: Sandwich Panels with in-Plane Metal Tube Reinforced Shape Memory Polymer (SMP) Foam Core This example sets forth and characterizes a new sandwich panel which comprises a hybrid core with a metallic microtube-reinforced shape memory polymer matrix (rather than the polymer resin used in Example 2). Otherwise, this embodiment is generally analogous to the grid-stiffened embodiment set forth in Example 2. In addition, here aluminum tubes were used because: they are (1) lighter than steel tubes; and (2) to exemplify that ductile, strong yet light structural reinforcing units are efficacious regardless of the types of unit or tube material used.

Materials

The shape memory polymer was synthesized by using polytetramethylene ether glycol (Sigma-Aldrich, St. Louis, Mo.) as the soft segment while diphenylmethane-4,4-diisocyanate (MDI) (Sigma-Aldrich, St. Louis, Mo.) and molecular extender 1,4-butanediol (BDO) (Acros Organics, New Jersey) as the hard segment. polytetramethylene ether glycol, diphenylmethane-4,4-diisocyanate, and 1,4-butanediol were demoisturized before use. The shape memory polyurethane was synthesized by pre-polymerization technology. Remaining diphenylmethane-4,4-diisocyanate and 1,4-butanediol (BDO) were added at last. Finally, the reacting polymer was poured into mold covered with Polytetrafluoroethylene sheet for easy de-molding. This was done in accordance with methodologies understood by those of ordinary skill in the art [see, e.g., 21] The SMP was designed according to the objectives of shape recovery temperature design.

The switching transition of the shape memory polymer was tailored by varying the soft segment length and hard segment content. The hard segment contents were 50.29% and 73.16%. The NCO/OH value was 1.05%.

The metallic millitubes for the hybrid cores were made of aluminum 6061-T6 (K & S Precision Metals, Chicago, Ill.). The elastic modulus and yielding strength of the aluminum tubes were 72 GPa and 120 MPa, respectively. Upon measuring, it was found that the inner diameter and outer diameter of the aluminum millitube were 1.92 mm and 2.52 mm, respectively.

Specimen Preparation

The aluminum millitubes were first layered up to 3 layers in the mold, with each of the layers along the same (essentially unidirectional), longitudinal direction (thus this is an embodiment of a Type-2 panel where all layers are unidirectional and now SMP is the filler). After all layers were added, the shape memory polymer was then infused into the millitubes preform by a Resin Infusion Molding (RIM) system according to conventional methodologies (see, e.g., [20]). After curing at 100° C. temperature for 12 hours, the cast cores were demolded and postcured (70° C. for 4 hours). The material and method of conventional SMP sandwich core was used the same material as used for the aluminum millitubes reinforced SMP.

As mentioned in Example 2, mass production of the hybrid cores can be easily realized using existing equipment and procedures in the composite industry. Therefore, ease of mass production is an advantage of sandwich panels in accordance with the invention, as set forth herein.

In this study, three layers of millitubes were fabricated with 40% volume fraction of millitubes (the rest 60% was the epoxy resin) for the cores. Therefore, the hybrid cores had the density of 1.1 g/cm$^3$. The glass transition temperature is 38° C.

Geometry and Test Configuration

The sandwich panels were subjected to central point impact test (simply supported at two ends). The impact tests were conducted by the Instron Dynatup 8250 HV Impact testing machine with a hemi-sphere tup nose (the diameter is 9 mm). Sandwich core were 101.6 mm long, 101.6 mm wide and 20.5 mm thick. The initiation energy and propagation energy were calculated using a data acquisition system integrated in the impact test machine, following the analogous protocol set forth in Example 2.

In order to simulate a 4 g bullet with 308 m/s initial velocity and impact on armor, the total impact energy is around 190 J. Therefore, in this study, 25 kg hammer with impact velocity of 3.9 m/s was used for this experiment and could create 190 J impact energy for the sandwich panels, following the analogous protocol set forth in Example 2.

Results and Discussion

Figure 10:
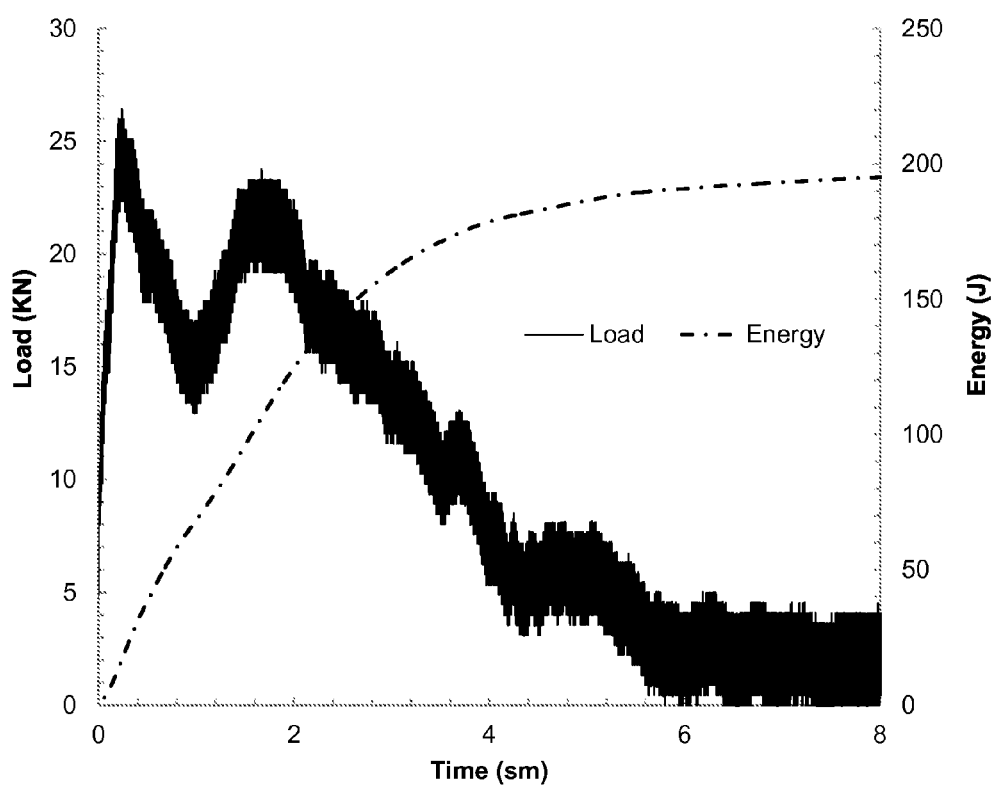
FIG. 10: Impact response of a type II sandwich panel which comprises a metallic microtube-reinforced shape memory polymer matrix, as set forth in Example 3.

Five specimens were tested in the specified impact velocity (3.91 m/s) protocol. The typical load-time and energy-time responses of the sandwich core under impact loadings are shown in FIG. 10. The average of peak load, initiation energy and propagation energy of the panels under impact loadings were calculated. The peak load, initiation energy and propagation energy of the sandwich core under impact loadings were 25KN, 45 J, and 147 J respectively.

As in Example 1 and Example 2, impact energy corresponding to the maximum impact force is defined as initiation energy. Propagation energy is defined as the difference between the maximum impact energy and the initiation energy.

Interfacial Debonding:

No undesired interfacial debonding of the face sheet from the sandwich core was observed under impact loading conditions. Only some micro-scale debondings between the millitubes and matrix were observed, while most millitube/matrix interfacial bondings remained intact. A significant ductile deformation and failure mode were observed. Without being bound by theory, it is believed that the horizontally aligned hollow millitubes provide the flexibility to the sandwich panel by allowing large deformation and plastic hinges within the millitubes.

Impact Failure Mode:

When the sandwich panels were subjected to impact loading, a large impact hole was created in the pure shape memory polymer core and a small impact indentation was observed in the SMP-millitubes sandwich core. When subjected to the impact loadings, the type-II sandwich cores of this example were found to have excellent flexibility and energy absorption ability. The plastic deformation of the aluminum millitubes became the dominant contributor to impact energy absorption, and most energy dissipations are assigned to the metallic millitubes. This mechanism protects the polymer matrix from the brittle crazing even though the matrix is relative brittle. As noted, almost no interface debonding occurred in the tested specimens. Accordingly, this embodiment provides a solution to the interface debonding problem which has been a major concern in the traditional foam cored sandwich structures.

Conclusions

The test results demonstrated: (i) interfacial debondings at or near the face sheet/core were largely excluded from these type-II sandwich cores (comprising horizontally aligned aluminum millitubes); (ii) the significant ductile failure was achieved in the tested panels rather than the brittle failure that occurred in panels with traditional SMP cores. The data in this Example indicated that the sandwich core of aluminum millitube grid-reinforced SMP is an option for critical structural applications requiring debonding and impact tolerance. Moreover, in accordance with the invention, it was shown that embodiments with SMP may be used to advantage because of the ductility of this polymer.

Example 4: Impact Mitigation of Sandwich Panels with Metal (Steel) Tube Grid as Reinforcement of a Foam Core Materials and specimen preparation was performed as set forth in Example 2 with the exception that the steel millitubes were extruded by using a mold to create equidistant indentation (every 12.70 mm). In this Example, three types of grid stiffened millitubes were fabricated with 40% volume fraction of steel millitubes (the rest 60% was the epoxy resin) for each core regardless of the number of layers of the millitube grid skeleton. The specimens were divided into three groups G1, G2, and G3 which had 1 layer, 2 layers, and 3 layers of millitube grid skeleton, respectively. All of these (G-1, G-2, G-3) are "type-II panels" as defined in Example 1. The density of the sandwich panel of G1, G2, and G3 were 1.62, 1.78, and 1.95 g/cm$^3$, respectively.

Geometry and Test Matrix

The sandwich panels were prepared (i.e., the face sheets were added) after 24 hours curing at room temperature and 1 hour post cure at 100° C.

Sandwich panels were subjected to two types of static tests: (i) static compression tests; (ii) static three-point bending test (simply supported at two ends). In addition the sandwich panels were subjected to two types of impact tests: (i) low velocity impact test as set forth in Examples 1 and 2; and (ii) ballistic impact tests with bullets fired from various types of guns.

Using the analogous protocol as set forth in Example 1, in the axial compression tests and three-point bending tests, the strain controlled loading mode was employed using MTS 810 machine (MTS Systems Corporation, Eden Prairie, Minn.) with a loading rate of 0.6 mm/min. The specimen sizes of G1, G2, and G3 for the bending test are 101.6 mm long, 25.4 mm wide, and 6.2 mm, 12.4 mm, and 18.6 mm high, respectively. The specimen sizes of G1, G2, and G3 for the compression test are 25.4 mm long, 25.4 mm wide, and 6.2 mm, 12.4 mm, and 18.6 mm high, respectively. For the three-point bending test, the span length was 90 mm.

Using the analogous protocol as set forth in Example 1, sandwich panels were also subjected to low velocity impact test. The impact tests were conducted by the Instron Dynatup 8250 HV Impact testing machine (Instron Corporation, Norwood, Mass.) with a hemi-sphere tup nose (the diameter was 12.7 mm). Dimensions of the G1, G2, and G3 sandwich panels are 101.6 mm long, 50.8 mm wide, and 12.7 mm, 19.1 mm, and 25.2 mm high, respectively. The initiation energy and propagation energy were calculated using a data acquisition system integrated in the impact test machine. For a 4 g bullet with 308 m/s initial velocity impact on armor, the total impact energy is around 190 J. To simulate this situation, in this study a 25 kg hammer with impact velocity of 3.9 m/s was used which created 190 J impact energy for the sandwich panels.

Figure 11:
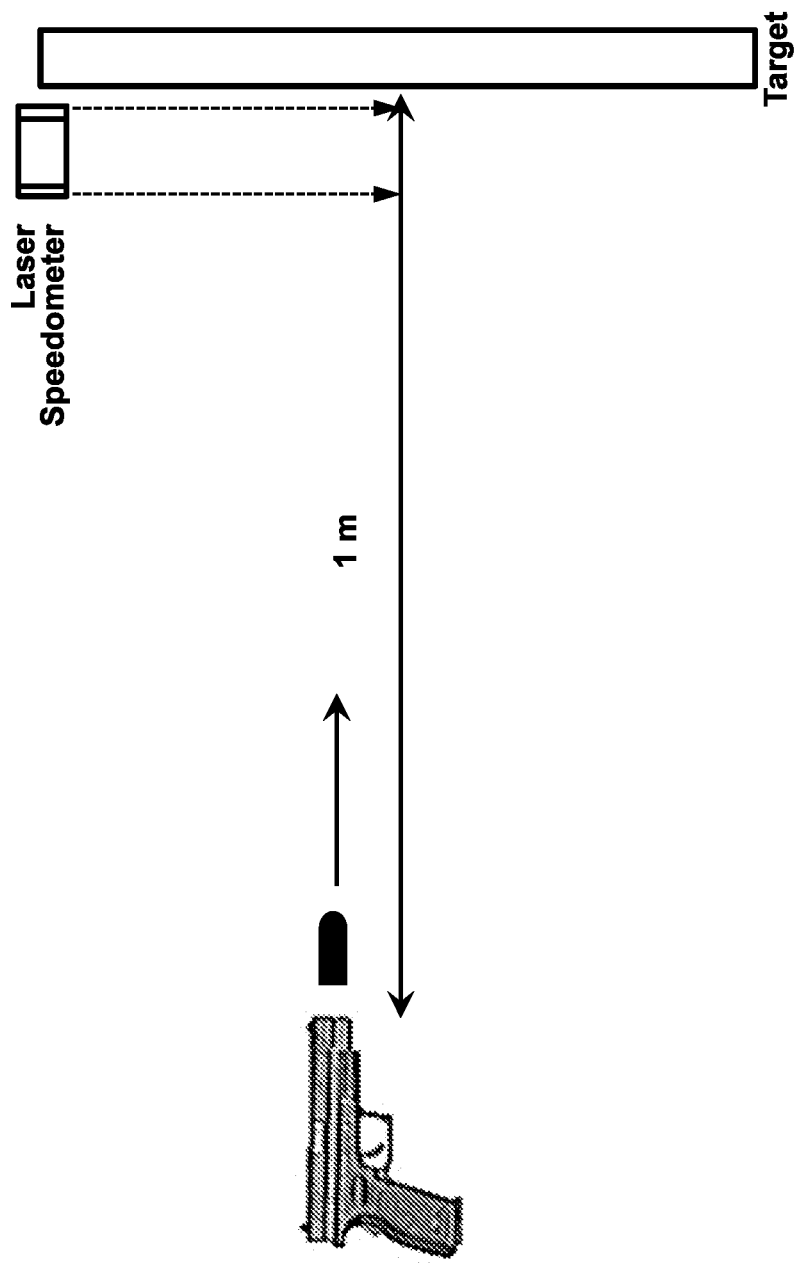
FIG. 11: Ballistic impact testing setup (not to scale) showing a gun 1 meter from a target, a projectile, and the location of the laser speedometer.

Sandwich panels were also subjected to ballistic impact testing. These impact tests were conducted by an XD pistol (Springfield Armory, Geneseo, Ill.) with 9 mm bullets, and a Ruger 10/22 revolver (Sturm, Ruger & Co., Inc., Newport, N.H.) with .22 caliber hollow point bullets. Dimensions of the sandwich panels were the same as the specimens in low velocity impact test. The high velocity impact test setup is shown in FIG. 11. The bullet speed was measured with laser speedometer. The shooting angle was 90° to the target.

Results and Discussion

Axial Compression Tests

Figure 12:
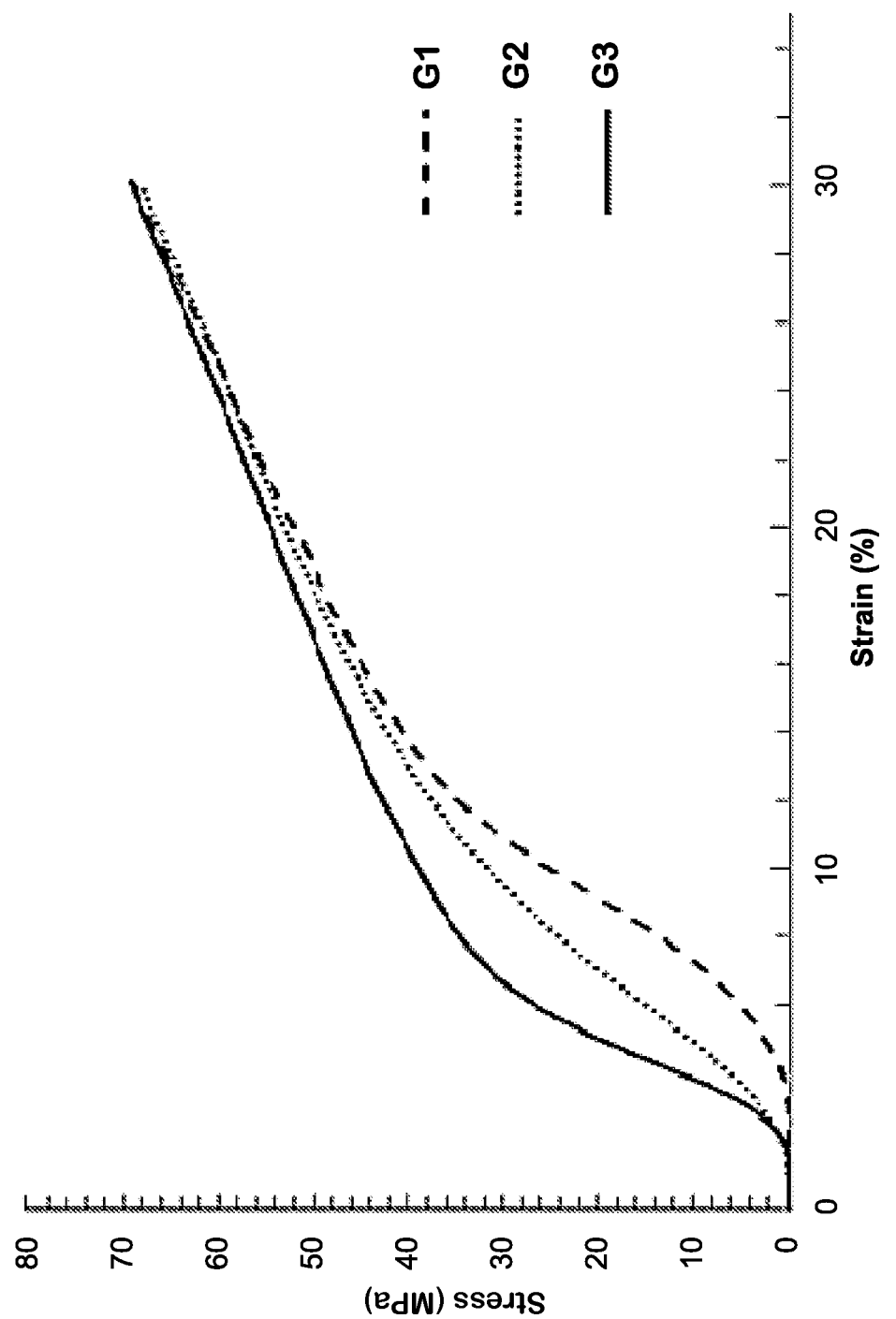
FIG. 12: Typical compressive strain-stress curves of the three types of sandwich panels (each with a different core). G-1 panel, ( - - - - ); G-2 panel (••••••) G-3 Panel, (———).

The typical compressive stress—strain curves of the three types of sandwich cores are plotted in FIG. 12. It is observed that G1, G2, and G3 have almost the same compression strength 68 MPa at 30% strain. However, as the number of steel grid layers increased, the modulus of the sandwich structure is increased with 281.56 MPa, 390.22 MPa, and 505.62 MPa for G1, G2, and G3, respectively. It was also observed that the compression stress of the three types of sandwich cores converge after 30% strain. This may be due to the consolidation of the hollow tubes. Once the hollow tubes were consolidated, the difference among the three groups was negligible. It was observed that upon the hollow steel tubes being squeezed, cracks propagated around the boundaries of the steel tubes due to interfacial shear stress.

Three-Point Bending Tests

Figure 13:
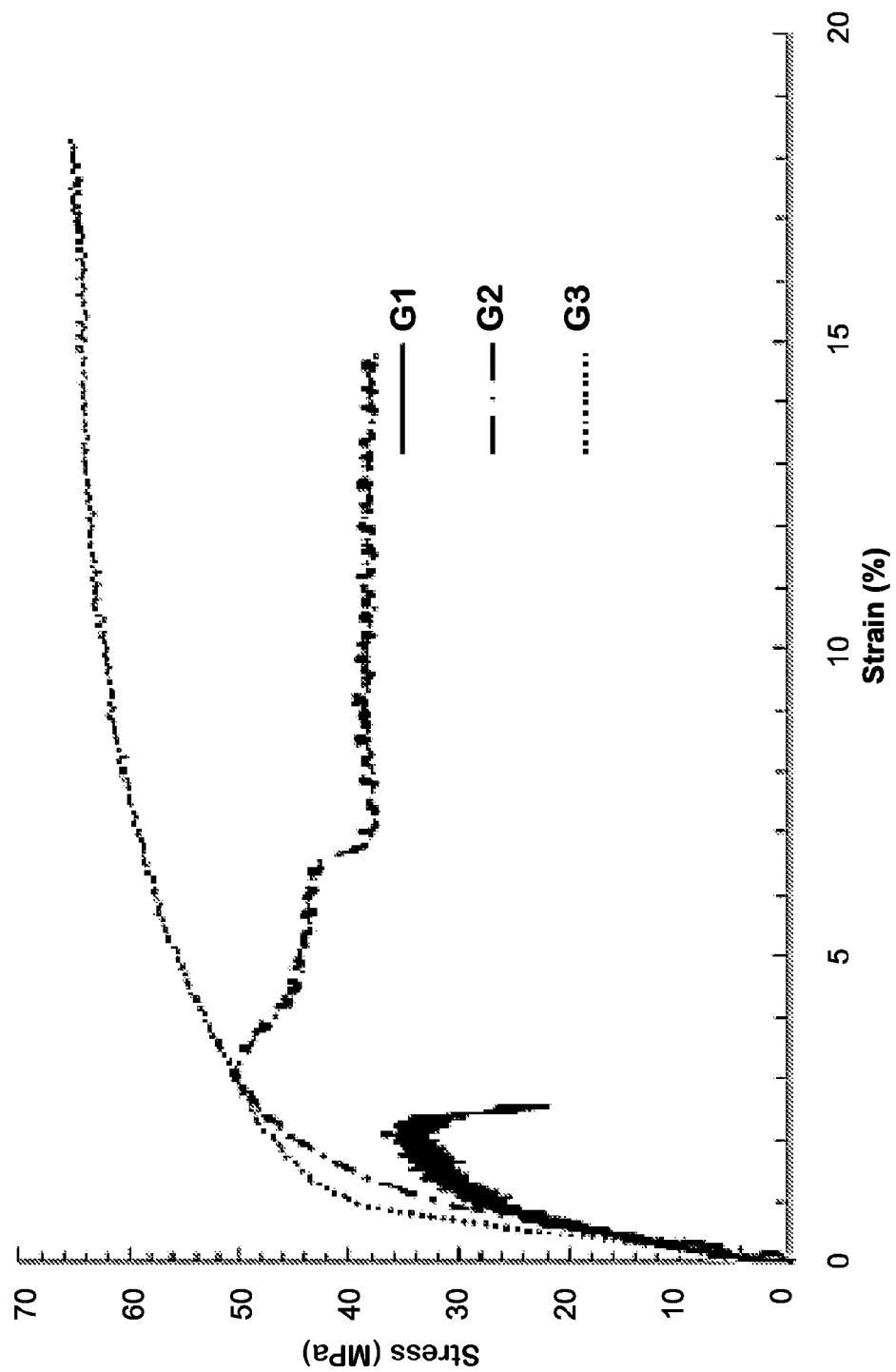
FIG. 13: Typical bending stress-strain curves of the three types of sandwich cores (each with a different core). G-1 Panel, (———) G-2 panel, (–·–·–·–); G-3 panel (••••••).

Typical bending stress-strain curves for the three types of sandwich cores are plotted in FIG. 13. The flexural strength of G-1, G-2, and G-3 were 36.1 MPa, 50.2 MPa, and 62.5 MPa, respectively. It is observed that the maximum bending strain and bending strength were increased as the number of the grid stiffened layers increased. It was also observed that as the number of the grid stiffened layer increased, the stress-strain curve behaved similarly to the post-yielding plastic deformation of metal materials due to the geometry of the hollow metal millitubes. The load first caused elastic deformation of the millitubes, followed by consolidation of the millitubes due to squeezing out of the air, yielding and plastic deformation of the consolidated millitubes. The crack initiation and propagation were detected along the loading line and from the bottom surface of the sandwich core to the middle plane. The rest of the sandwich core was not damaged. The crack propagation was along the interface between the adhesive and the hollow tubes, believed to be due to the stress concentration at the polymer/tube interface.

Quasi-Static Low Velocity Impact Tests

Impact Response

Figure 14A:
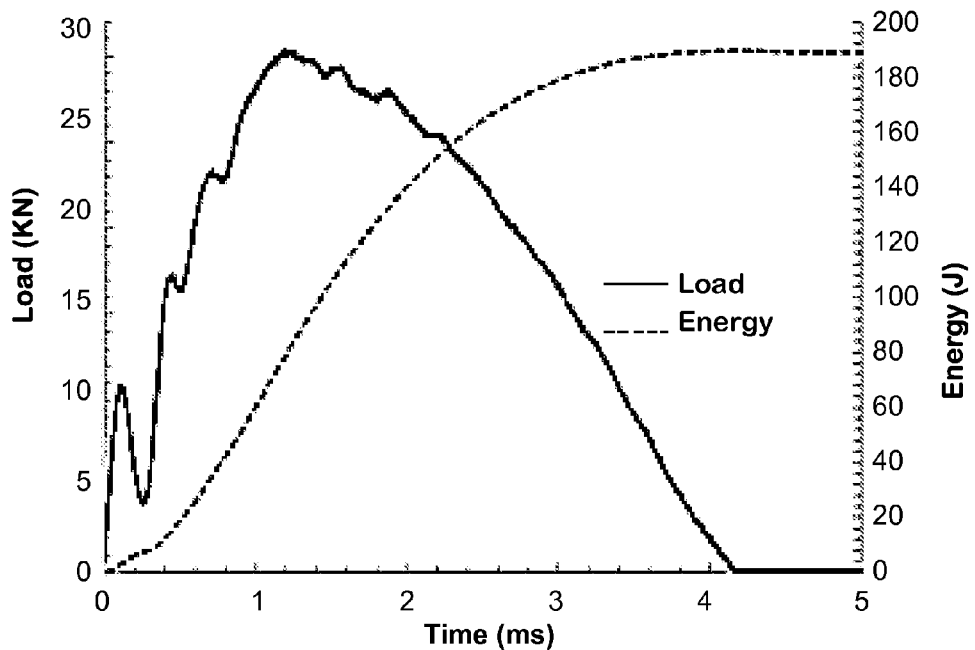
FIG. 14: The typical load-time and energy-time responses of the G-3 sandwich panels at three locations: (panel a) bay area, (panel b) node area, and (panel c) rib area. In each panel: Energy ( - - - - ); Load (———).

Low velocity impact test was conducted at three locations (bay, node, and rib) of the sandwich panel. The typical load-time and energy-time responses of the G-3 sandwich panels under impact loadings are shown in FIG. 14(a-c). The bay area was 10 mm×10 mm, the hammer impact area was a 12 mm diameter rounded area.

Impact energy corresponding to the maximum impact force was defined as initiation energy. Propagation energy was defined as the difference between the maximum impact energy and the initiation energy. These definitions have been used previously [19]. It has been suggested that the initiation energy is basically a measurement of the capacity for the target to transfer energy elastically and higher initiation energy usually means a higher load carrying capacity; on the other hand, the propagation energy represents the energy absorbed by the target for creating and propagating gross damage.

Figure 15A:
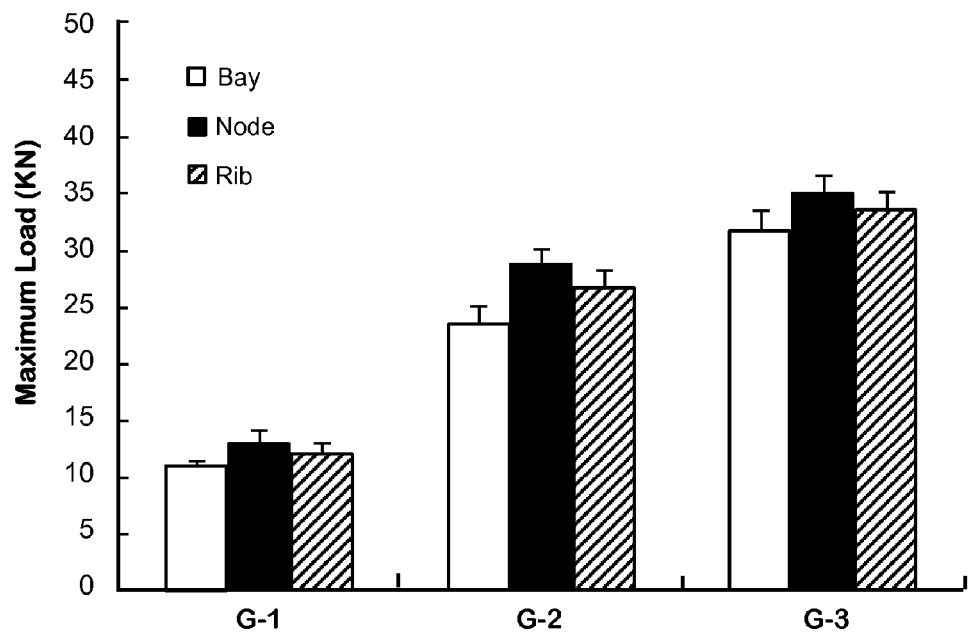
FIG. 15: The maximum load and propagation energy for different impact locations on the panels: (panel a) maximum load, (panel b) propagation energy. In each panel data is shown by: white bars for bay; black bars for node; cross-hatch bars for rib.
Figure 15B:
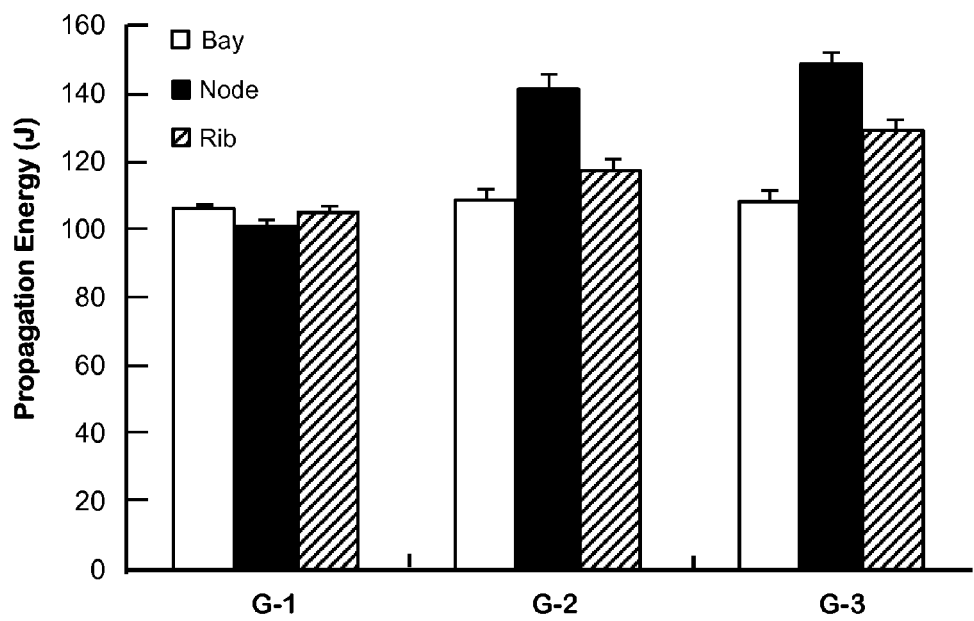

The peak load and propagation energy of the panels with different impact locations are presented in FIG. 15(a) and FIG. 15(b). One can see that the node areas have a higher load carrying capacity and higher propagation energy as compared with bay areas and rib areas of each group. As the number of the millitube layers increased, the load carrying capacity and propagation energy increased at the same impact location of each group.

Figure 14B:
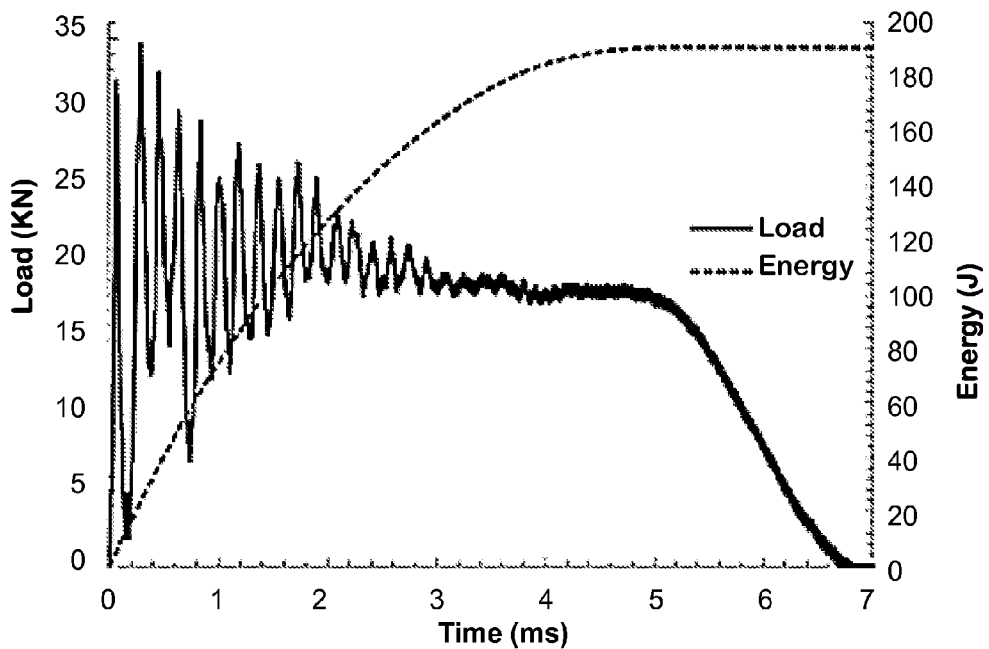
Figure 14C:
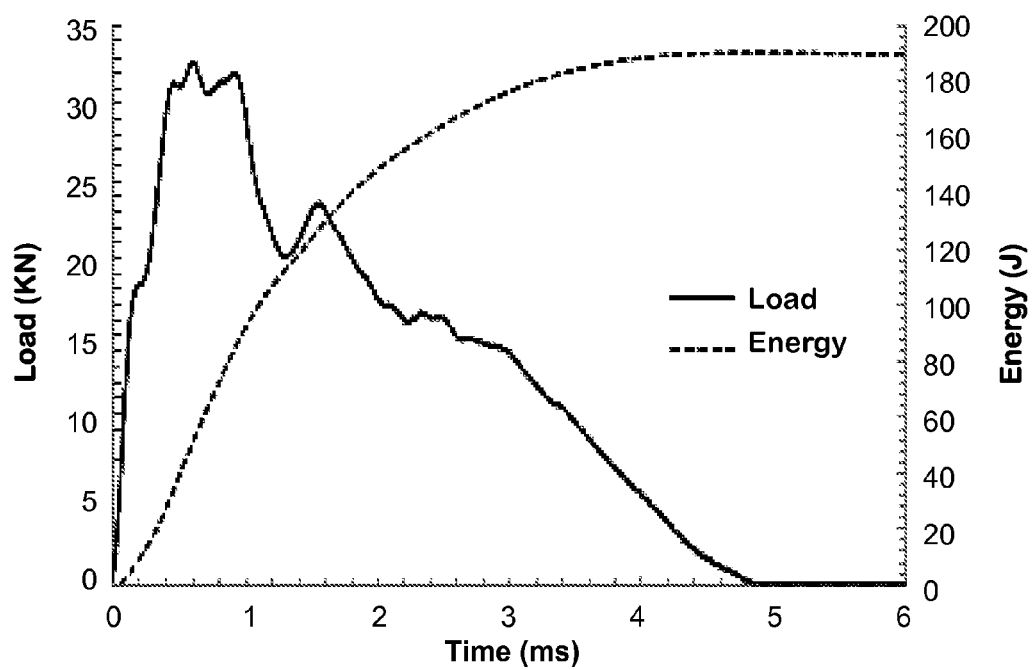

In FIG. 14(a-c), it is seen that the shapes of the load-time curves were different as the impact location changes. When the tup impacted at a bay area, the impact energy and impact wave were constrained by the surrounding steel tube-stiffened grid skeleton, with energy then transferred to the entire sandwich structure by the interlocked millitube and surrounded adhesive matrix. Therefore, the major energy transfer process was dependent on the adhesive matrix. However, when the tup impacted at the node area, the impact energy and impact wave were directly transferred by the millitube stiffened grid and interlocking mechanism. The impact wave was distributed at each node and transferred along two directions (the grid skeleton) and absorbed by the entire sandwich structure. Therefore, the load-time curve of the node area exhibited damping characteristic, as shown in FIG. 14(b). The propagation energy of the node area was 148.65 J, the highest as compared with a bay area (107.48 J) or rib area (128.67 J). For impact at a rib, the transfer of impact energy and impact wave was between that seen with the impact at a bay and impact at a node because the stress wave propagates mainly along one direction in the grid skeleton.

Failure Mode

For the sandwich panels under low velocity impact, no interfacial debonding was observed. Only some micro-scale debondings between the millitubes and matrix were observed after impact, while most millitubes/matrix interfacial bondings were still in contact. Without being bound by theory, it is believed that the millitubes (in a grid configuration further supported by tube nodes) provide flexibility to the sandwich panel by allowing large deformation while maintaining integrated mechanical interlock within the millitubes in the grid. This embodiment had excellent impact energy absorption and strong suppression of interfacial debonding near the face sheet. Accordingly, the invention provides a solution to the interface debonding problem which has been a major concern with the traditional foam-cored sandwich structures.

It was also observed that the grid-stiffened sandwich panels were not broken into pieces, there were no impact windows "Impact window" refers to the open space created in the face sheet and core, whereas "impact indentation" refers to plastic deformation on the face sheet, and they even fully rebounded after impact. Only an impact indentation could be seen on the top view. Accordingly, it was found that this new sandwich panel could withstand more than a one-time impact loading. A big circular area could be found on the bottom, which was impact effect area. After measuring the diameter of impact effect area and impact indentation area, it is found that the impact effect area was 40 times of impact indentation area. This phenomenon is consistent with the presently understood impact energy transfer mechanism.

Based upon observation, it was found that when the sandwich was subjected to the impact loadings, initially, the impact energy and impact wave were spread or distributed from the face sheet to the sandwich core locally and then passed the first layer of steel millitubes stiffened grid and caused plastic deformation of local millitubes and surrounding matrix. The impact energy was distributed as stress wave propagated in the sandwich structure. The stress wave was propagated along the orthotropic millitube grid direction and the isotropic adhesive matrix. It was further propagated to the layers beneath and caused new deformation of millitube and matrix at each millitube grid node area due to the mechanical interlocking. It was observed that crack propagation was along multiple tracks instead of a single track in the sandwich core. This phenomenon also explained why the load-time curve presented damping characteristic in FIG. 14(b). Finally, the remaining small amount of impact energy and impact wave was absorbed by the bottom sheet of sandwich panels. The whole impact damage zone was cone shaped.

Thus, these grid stiffened sandwich panels possessed excellent flexibility and energy absorption ability. The plastic deformation of the steel millitube-stiffened grid becomes the dominant contributor of absorbing impact energy and impact wave, and most energy dissipations were assigned to the grid skeleton and surrounding matrix. This mechanism protects the polymer matrix from the brittle crazing even though the matrix is quite brittle (with only about 3.5% maximum elongations).

Ballistic Impact Test

Three types of sandwich panels (G1, G2, G3) were subjected to this ballistic impact testing. The shooting distance between target and pistol was 1 M. The bay area of the sandwich panel was chosen as ideal impact location. However, actual impact locations were distributed on the bay, rib, and node areas, due to the recoil of the pistol.

Figure 16A:
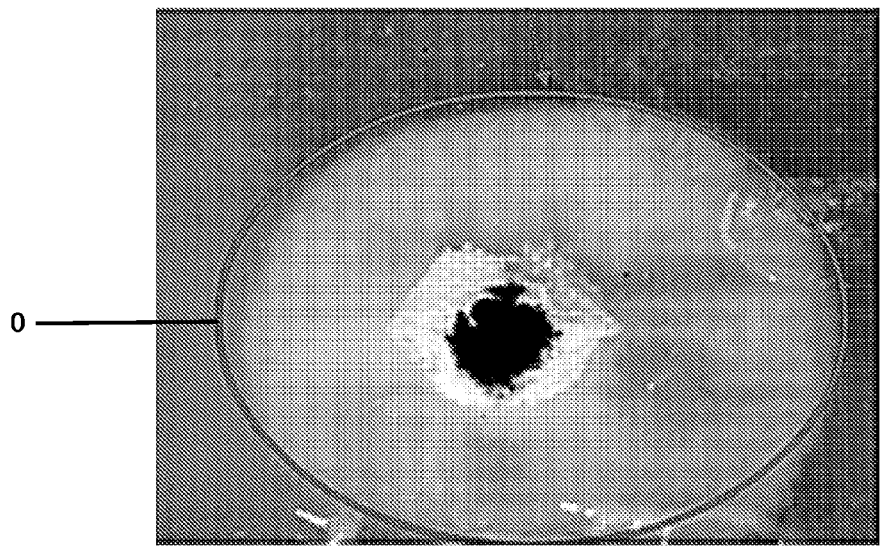
FIG. 16: Failure mode of G-1 sandwich panel after 9 mm bullet ballistic impact test: (panel a) top view of FRP face sheet with an oval (0) indicating the impact area; (panel b) bottom view after peeling off FRP back sheet showing a deformed bullet (1).
Figure 16B:
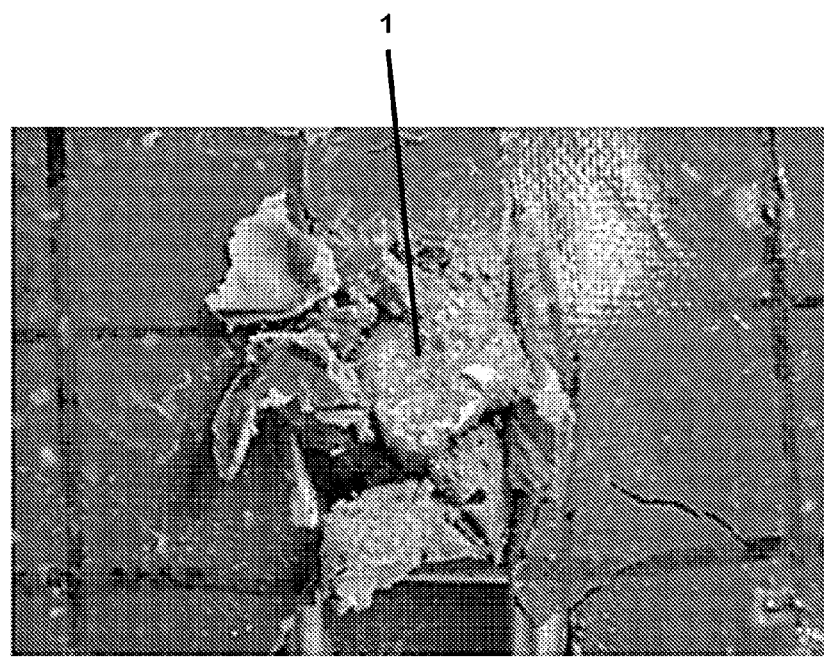

Two types of bullets (9 mm and 0.22 hollow point) were used as projectiles. The bullet weights were 7.45 g and 2 g, respectively. The muzzle velocities were 390 m/s and 440 m/s, respectively. The impact energy was 560 J and 190 J, respectively. For the single layer millitube grid sandwich panel, the 9 mm bullet penetrated the face sheet, but was caught by the grid skeleton within the panel, as shown in FIG. 16. FIG. 16(a) shows the top view of the FRP face sheet after impact. In FIG. 16(b), the black lines indicate the location of the millitubes. It is observed that the bullet was caught at the corner of the bay area. The bullet has a 9 mm diameter and still was caught by the 12.7×12.7 grid skeleton. FIG. 17 presents the 9 mm bullet deformation before and after ballistic impact test on the two layer grid millitube cored sandwich panel.

Figure 17A:
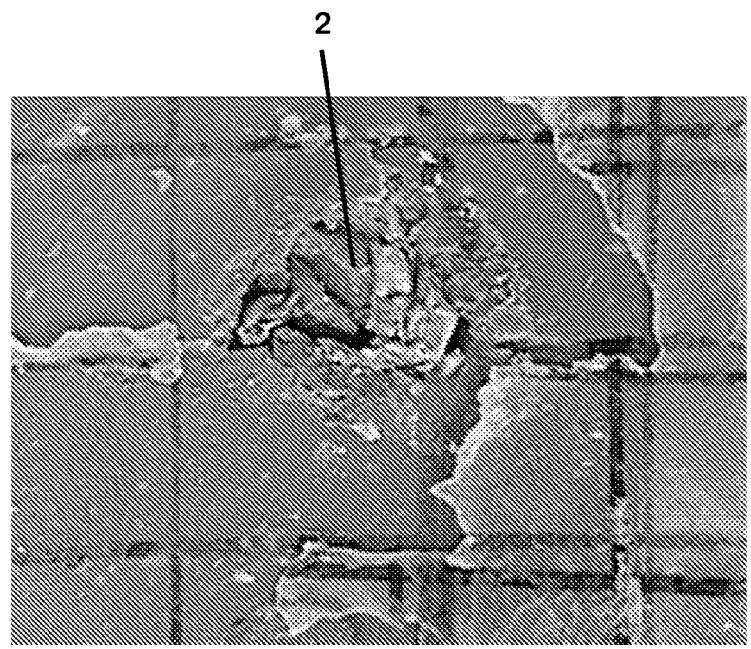
FIG. 17: Failure mode of G-2 sandwich panel after ballistic impact test: (a) top view of sandwich core showing a deformed bullet (2); (b) bottom view of sandwich core with an oval (3) indicating the impact effect area. In these views both the face sheet and back sheet were pulled off in order to view the damaged core.
Figure 17B:
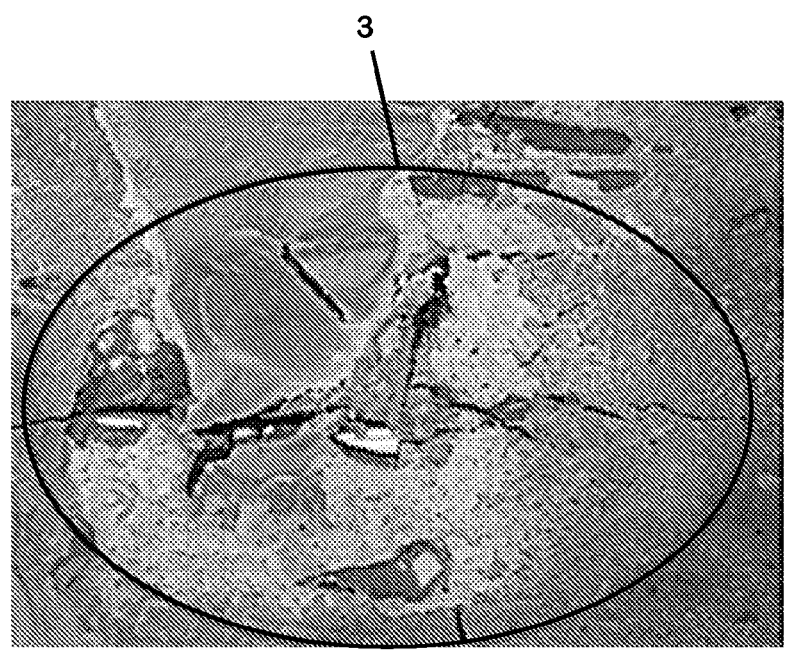

For two layers (and it is expected for three layers) millitube grid skeleton cored sandwich panel, the 9 mm bullet could not perforate the whole panel and was caught by the grid skeleton at the bottom of the panel, as shown in FIGS. 17(a) and (b) which show the top view and bottom view of the sandwich panel after impact, respectively. It was observed that the bullet was also caught at the corner of the bay area. The impact effect area was almost the same as that in FIG. 16(b). This result further validates the hypothesized impact energy transfer mechanism set forth above, even in the ballistic impact condition.

Figure 18:
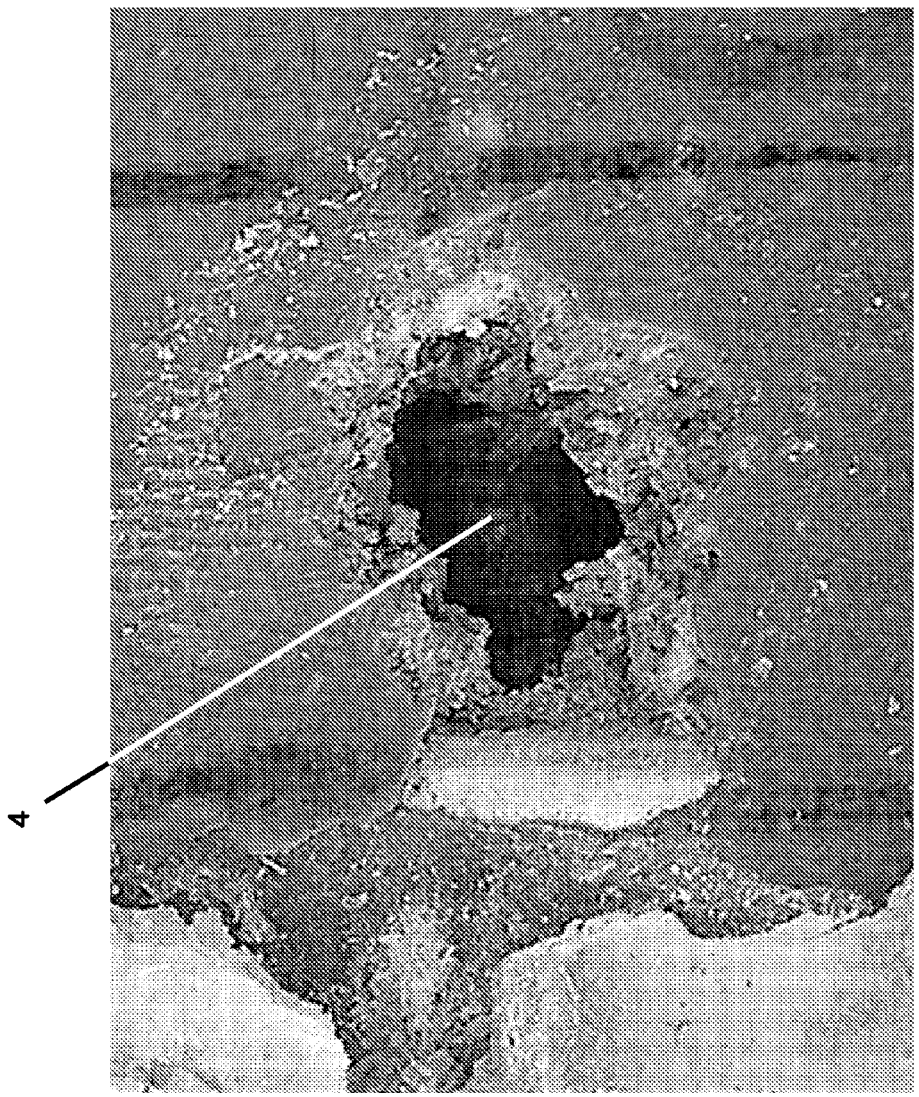
FIG. 18: Failure mode of G2 sandwich panel after 0.22 bullet ballistic impact test with the location of the bullet (4) indicated.

Some G2 sandwich panels were tested by using .22 caliber hollow point bullet (5.6 mm diameter), as shown in FIG. 18. A 0.22 bullet only has 2 g weight but its muzzle velocity is 440 m/s and impact energy is 190 J. The bullet diameter is 5.6 mm which is very small compared with the 12.7 mm×12.7 mm bay size. After the 0.22 bullet impacted the sandwich panel, it was crushed and fragmented to several pieces. However, the shell fragments were still caught by the adhesive matrix. This result indicates that the a sandwich panel of the invention can catch a bullet even if the bullet caliber is much smaller than the bay size.

Figure 19A:
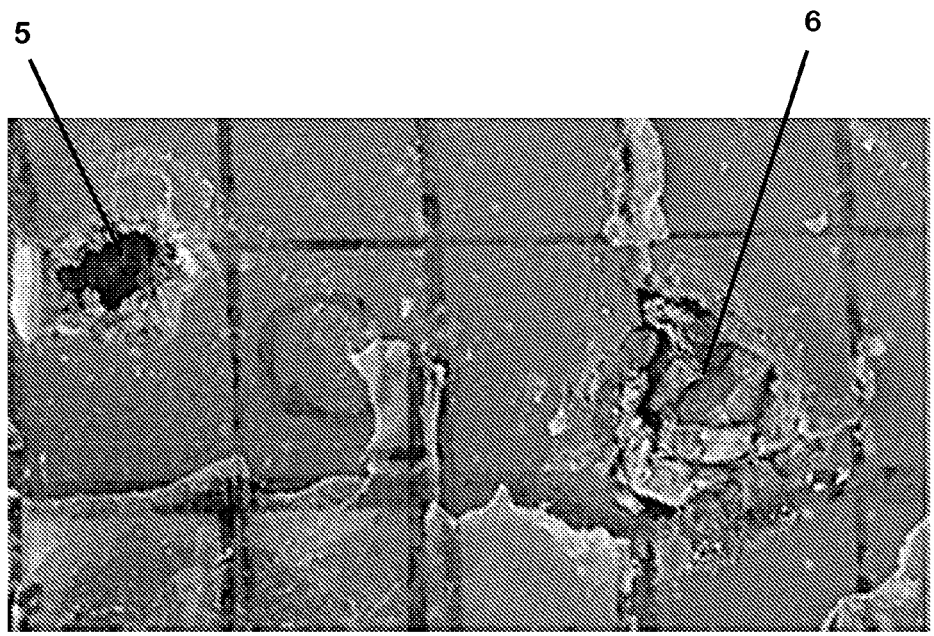
FIG. 19: Failure mode of G2 sandwich panel after double ballistic impact testing including impact by a .22 caliber bullet and a 9 mm bullet: (a) top view with location of .22 caliber bullet (5) and a 9 mm bullet (6); (b) bottom view, with the respective impact areas designated by ovals .22 caliber bullet (7) and 9 mm bullet (8).
Figure 19B:
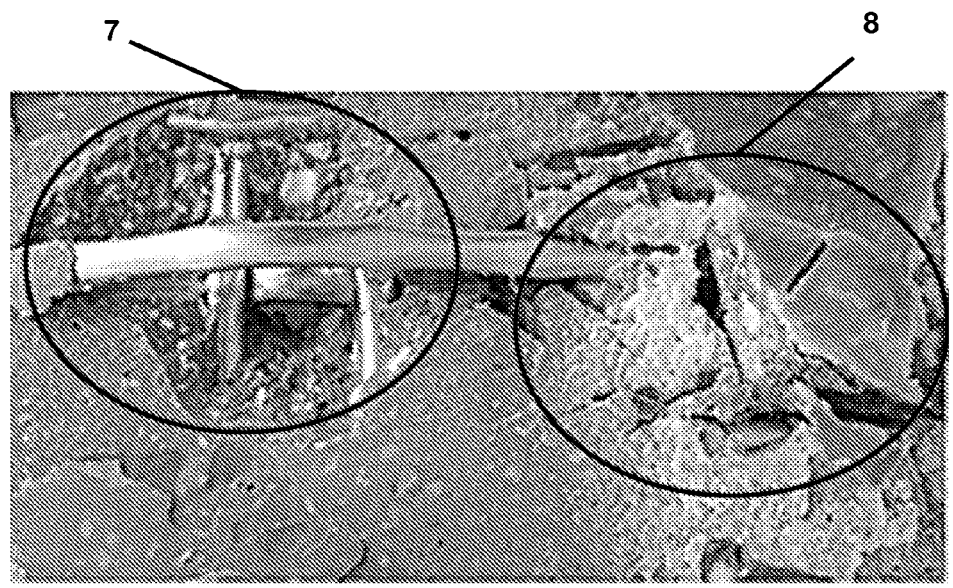

In order to test the multiple impact resistant ability of sandwich panels in accordance with the invention, G2 specimens were shot twice by using both a 9 mm bullet and a .22 caliber bullet, as shown in FIG. 19. FIGS. 19(a) and (b) show the top view and the bottom view of the sandwich core, respectively. It is observed that the two bullets were confined by the millitube grid skeleton cored sandwich panel. The impact energy was absorbed or transferred by the plastic deformation of the millitubes and fracture of the adhesive. Neither bullet perforated the sandwich panel, and each stayed in the crater it created. It was observed that 9 mm and .22 caliber bullets are all deformed and squeezed with 560 J and 190 J impact energy. These results indicate that the sandwich panel in accordance with the invention can withstand more than a single instance of a ballistic impact load, such as may occur in a military conflict or other attack situations.

Various commercially available bullet-proof and blast-resistant panels are currently used in many engineering applications, such as bullet-proof walls, glass doors, and so on. However, their weight and costs can be high. Moreover they require high temperature compression fabrication, whereas in the present invention one can fabricate at room temperature. Also, commercially available bullet-proof and blast-resistant panels only have glass fiber reinforced polymer laminate composites. For example, we compared certain commercial products, and Table 3 summarizes the cost and density of panel embodiments G1, G2, G3 of the present invention with some commercially available products GlasticShield™ (GlasticShield™, Cleveland, Ohio) and Armortex® (Armortex, Schertz, Tex.). It was observed that the proposed sandwich panel has the lowest density and very economical cost.

TABLE 3

Cost and density comparison of G1, G2, G3 panel embodiments with selected commercially available products

| Sample Types | Density (g/cm³) | Cost ($/cm²) |
| --- | --- | --- |
| GlasticShield ™ | 1.99 | data not available |
| Armortex$^R$ | 2.43 | 0.013 |
| G1 | 1.62 | 0.0073 |
| G2 | 1.78 | 0.0091 |
| G3 | 1.95 | 0.011 |

The ballistic impact performance of G1, G2 and G3 embodiments was also compared with the same two commercial products—GlasticShield™ and Armortex®. The results are presented in Table 4. As compared with the 9 mm and .22 caliber bullets, the proposed sandwich panel can stop the bullet, as shown in FIGS. 16-19, and with lower weight and low cost. Therefore, panels of the invention are understood to have similar performance as compared to various state-of-the-art products, yet having the advantages of lower weight and low cost.

TABLE 4

Performance Comparison between of G1, G2, G3 panel embodiments with selected commercially available products

| Sample Types | Bullet | Velocity (m/s) |
| --- | --- | --- |
| GlasticShield ™ | 0.44 | 411 |
| Armortex$^R$ | 9 mm | 358 |
| G1 | 9 mm/.22 | 390/440 |
| G2 | 9 mm/.22 | 390/440 |
| G3 | 9 mm/.22 | 390/440 |

Conclusions

The test results demonstrated that: (i) interfacial debondings at or near the face sheet/core were eliminated or significantly reduced; (ii) rather than the brittle failure which occurs in the traditional syntactic foam cores, significant ductile failure was achieved with the sandwich panels of the invention; (iii) sandwich panels in accordance with the invention can be of light weight and may be used as bulletproof armor; (iv) sandwich panels of the invention could withstand multiple ballistic impacts in the same general region; and, (v) the panels of the invention had lower weight ratio, lower cost, and better impact resistance as compared to various commercially available products. This data shows that sandwich panels in accordance with the invention are an option for critical armor applications which require debonding resistance and multiple impact tolerance.

CITATIONS

[1] Sequeira T S, Roulin Y, Michaud V, Manson J.-A E. Hybrid processing of thick skins for honeycomb sandwich structures. Composites Science and Technology, 71: 183-189 (2011).

[2] Reddy T Y, Wen H M, Reid S R, Soden P D. Penetration and perforation of composite sandwich panels by hemispherical and conical projectiles. ASME Journal of Pressure Vessel Technology, 120: 186-194, (1998).

[3] Shutov F A. Syntactic polymer foams. in Klempner D and Frisch K C ed. Handbook of polymer foams and foam technology, Hanser publishers: 355-374, (1991).

[4] Griffith G. Carbon foam: a next-generation structural material. Industrial Heating, 69: 47-52, (2002).

[5] Evans A G, Hutchinson J W, and Ashby M F. Multi-functionality of cellular metal systems. Progress in Materials Science, 43: 171-221, (1998).

[6] Van Vuure A W. Composite panels based on woven sandwich-fabric preforms. Ph.D. Thesis, Katholieke Universiteit Leuven, Belgium, (1997).

[7] Hosur M V, Abdullah M, Jeelani S. Manufacturing and low-velocity impact characterization of foam filled 3-D integrated core sandwich composites with hybrid face sheets. Composite Structures, 69:167-181, (2005).

[8] Bardella L and Genna F. On the elastic behavior of syntactic foams. International Journal of Solids and Structures, 38: 7235-7260, (2001).

[9] Hasebe R S and Sun C T. Performance of sandwich structures with composite reinforced core. Journal of Sandwich Structures and Materials, 2: 75-100, (2000).

[10] Li G and Jones N. Development of rubberized syntactic foam. Composite Part A: Applied Science and Manufacturing, 38: 1483-1492, (2007).

[11] Li G and Muthyala V D. A cement based syntactic foam. Materials Science and Engineering A, 478:77-86, (2008).

[12] Li G and John M. A crumb rubber modified syntactic foam. Materials Science and Engineering A, 474: 390-399, (2008).

[13] Cristiani C, Finocchio E, Latorrata S, Visconti C G, Bianchi E, Tronconi E, Groppi G, Pollesel P. Activation of metallic open-cell foams via washcoat deposition of Ni/MgAl2O4 catalysts for steam reforming reaction. Catalysis Today, Available online 16 Oct. 2012, http://dx.doi.org/10.1016/j.cattod.2012.09.003.

[14] Laschet G, Kashko T, Angel S, Scheele J, Nickel R, Bleck W, Bobzin K. Microstructure based model for permeability predictions of open-cell metallic foams via homogenization. Materials Science and Engineering: A, 472:214-226, (2008).

[15] Chakravarty U K. An investigation on the dynamic response of polymeric, metallic, and biomaterial foams. Composite Structures, 92:2339-2344, (2010).

[16] John M and Li G. Self-Healing of Sandwich Structures with Grid Stiffened Shape Memory Polymer Syntactic Foam Core. Smart Materials and Structures, 19: paper No. 075013 (12 pages), (2010).

[17] Li G and Chakka V S. Isogrid Stiffened Syntactic Foam Cored Sandwich Structure under Low Velocity Impact. Composites Part A: Applied Science and Manufacturing, 41: 177-184, (2010).

[18] Ji G, Li G, Pang S S, Alaywan W. Strength Enhancement of Advanced Grid Stiffened FRP Tube Confined Concrete Cylinders under Fire. Journal of Composite Materials, 43: 2555-2569, (2009).

[19] Li G and Muthyala V D. Impact Characterization of Sandwich Structures with an Integrated Orthogrid Stiffened Syntactic Foam Core. Composites Science and Technology, 68:2078-2084, (2008).

[20] B. D. Agarwal, L. J. Broutman, K. Chandrashekhara, Analysis and performance of fiber composites, John Wiley & Sons, Inc. $3^{rd}$ ed. (2006)

[21] Oertel, G., & Abele, L., Polyurethane Handbook: Chemistry, Raw Materials, Processing, Application, Properties, Hanser Publishers. Distributed in USA by Scientific and Technical Books, Macmillan (1985)

[22] Li, G. and Chakka, V. S., 2010, Isogrid Stiffened Syntactic Foam Cored Sandwich Structure under Low Velocity Impact. Composites Part A: Applied Science and Manufacturing, 41(1), 177-184.

[23] Li, G. and Chakka, V. S., 2010, Isogrid Stiffened Syntactic Foam Cored Sandwich Structure under Low Velocity Impact. Composites Part A: Applied Science and Manufacturing, 41(1), 177-184.

All documents cited herein, whether patent or non-patent literature, and all patent-related documents relied on for priority or relatedness for this application are fully incorporated by reference herein for all purposes.

What is claimed:

1. A composite material comprising a matrix and a grid; wherein:
   (a) said matrix comprises polymer;
   (b) said grid comprises a plurality of layers, wherein each said layer comprises a network of mechanically interlocking millitubes or microtubes;
   (c) said polymer has an elongation at break from 3% to 200%; an elastic modulus from 1.5 GPa to 350 GPa; and an ultimate tensile strength from 25 MPa to 350 MPa;
   (d) said millitubes or microtubes comprise hollow, shape memory-alloy tubes, with a diameter of 3 mm or less; an elongation at break from 3% to 100%;
   an elastic modulus from 1 GPa to 1000 GPa; and an ultimate tensile strength from 1 MPa to 1000 MPa;
   (e) i) said layers that are adjacent to one another are interwoven with one another; or ii) said adjacent layers comprise indentations that are interposed or seated within one another, or both; or both i) and ii);
   (f) said matrix surrounds and provides support to said grid, and said grid confines and increases the strength of said matrix.

2. The composite material of claim 1, wherein said millitubes or microtubes in adjacent said layers are parallel to one another.

3. The composite material of claim 1, wherein said millitubes or microtubes in adjacent said layers are perpendicular to one another.

4. The composite material of claim 1, wherein said millitubes or microtubes in adjacent said layers are interwoven with one another.

5. The composite material of claim 1, additionally comprising a face sheet bonded to at least one surface of said material; wherein said face sheet comprises a laminated composite comprising polymer reinforced with glass fibers, carbon fibers, or both.

6. The composite material of claim 1, additionally comprising a face sheet bonded to each of two opposite surfaces of said material; wherein each of said face sheets comprises a laminated composite comprising polymer reinforced with glass fibers, carbon fibers, or both.

7. The composite material of claim 1, wherein said millitubes or microtubes in adjacent said layers are aligned at an angle between 0° and 90° with respect to one another.

* * * * *